(12) United States Patent
Buchsbaum

(10) Patent No.: US 8,696,916 B2
(45) Date of Patent: Apr. 15, 2014

(54) PROCESS AND APPARATUS FOR WATER PURIFICATION

(75) Inventor: Norbert Nathan Buchsbaum, Houston, TX (US)

(73) Assignee: Cryodesalination, LLC, Houston, TX (US)

( * ) Notice: Subject to any disclaimer, the term of this patent is extended or adjusted under 35 U.S.C. 154(b) by 0 days.

(21) Appl. No.: 13/816,094

(22) PCT Filed: Aug. 5, 2011

(86) PCT No.: PCT/US2011/046759
§ 371 (c)(1),
(2), (4) Date: Feb. 8, 2013

(87) PCT Pub. No.: WO2012/021402
PCT Pub. Date: Feb. 16, 2012

(65) Prior Publication Data
US 2013/0134102 A1 May 30, 2013

Related U.S. Application Data

(60) Provisional application No. 61/371,731, filed on Aug. 8, 2010, provisional application No. 61/407,505, filed on Oct. 28, 2010, provisional application No. 61/444,736, filed on Feb. 20, 2011.

(51) Int. Cl.
*C02F 1/22* (2006.01)
*C02F 1/52* (2006.01)

(52) U.S. Cl.
USPC .............................. 210/774; 62/542; 210/737

(58) Field of Classification Search
USPC ..................................... 210/774, 737; 62/542
See application file for complete search history.

(56) References Cited

U.S. PATENT DOCUMENTS

| | | | |
|---|---|---|---|
| 3,213,633 A | 10/1965 | Rosenstein et al. | |
| 3,399,538 A * | 9/1968 | Sliepcevich et al. | ............ 62/536 |
| 4,211,645 A | 7/1980 | Zajic et al. | |
| 5,250,192 A | 10/1993 | Martel, Jr. | |
| 5,614,107 A | 3/1997 | Mallia, Jr. | |
| 6,319,407 B1 | 11/2001 | Maatta et al. | |

FOREIGN PATENT DOCUMENTS

WO 2005/063630 A1 7/2005

OTHER PUBLICATIONS

International Search Report from PCT/US2011/046759 mailed on Mar. 22, 2012 (3 pages).

* cited by examiner

*Primary Examiner* — Thomas M Lithgow
(74) *Attorney, Agent, or Firm* — Osha • Liang LLP

(57) ABSTRACT

A process for purifying water via freezing is disclosed. The process may include: contacting an aqueous mixture with a flotation medium, wherein the flotation medium has a density greater than or equal to the density of ice or hydrate and less than the density of the aqueous mixture or concentrated brine at its freezing point; reducing the temperature of the aqueous mixture to a temperature equal to or below the freezing point of the aqueous mixture to form ice or hydrate and a concentrate; phase separating the concentrate and the flotation medium; recovering the concentrate; and recovering the ice or hydrate and flotation medium as a slurry. Upon melting, phase separation of the resultant water from the flotation medium may provide a purified water product.

25 Claims, 19 Drawing Sheets

PROCESS AND APPARATUS FOR WATER PURIFICATION

CROSS-REFERENCE TO RELATED APPLICATION

This application, pursuant to 35 U.S.C. §119(e), claims priority to U.S. Provisional Application Ser. Nos. 61/371,731, 61/407,505, and 61/444,736, filed Aug. 8, 2010, Oct. 28, 2010, and Feb. 20, 2011, respectively. Each of these applications is herein incorporated by reference in its entirety.

FIELD OF THE DISCLOSURE

Embodiments disclosed herein relate generally to a process for purifying or partially purifying impure waters, such as brine or other aqueous mixtures containing various salts, heavy metals, or other impurities via freezing. Processes disclosed herein may also be used to reduce the water content of aqueous mixtures, such as for the concentration of fruit juices, alcoholic beverages, coffee, and tea, among others. In another aspect, embodiments disclosed herein relate to processes for recovering metals or salts dissolved in aqueous solutions.

BACKGROUND

Processes for the desalination of seawater, brackish water, or in general saline waters associated with the production of oil, gas, coal and other minerals have now been practiced on a large scale for more than 50 years. For many years, thermal technologies were the only viable option, and multi-stage flash (MSF) was established as the baseline technology. Multi-effect evaporation (MEE) may now vie for that status. With the growth of membrane science, however, reverse osmosis (RO) overtook MSF as the leading desalination technology, and is presently considered the baseline technology.

Among the numerous factors affecting the selection of a desalination process, the cost of energy overshadows all the others. While energy cost is not the only determining criterion for process selection, it is definitely one of great concern. Additional issues such as environmental footprint, chemicals consumption and discharge, maintenance, ease of operation, reliability, on-stream factor, safety, and overall cost of production will influence the selection.

Thermal systems are effective but energy intensive, requiring in their simplest form approximately 1000 btu/lb to vaporize water. To compensate, distillation systems use many stages to reuse the heat energy repeatedly, with intricate heat exchange networks.

In the last several years, Seawater Reverse Osmosis (SWRO) has realized substantial power reductions. In spite of these improvements, hailed by some as approaching the thermodynamic minimum power expenditure, the data published by ADC (Affordable Desalination Collaboration, California, USA) show that the overall power costs still represent approximately 45-55% of the total cost of production. Additionally, there are concerns with regard to environmental impact, maintenance, and on-stream time. In their totality, these factors prevent SWRO, in its present form, from being the optimal desalination choice. Reverse osmosis systems have steadily increased recovery rates and now have ways to recapture energy from the pressurized waste brine. Nevertheless, in spite of these forward strides, these systems have not yet attained the elusive goals of environmental friendliness, ease of operation, low maintenance, low operating costs, low investment, and long-term reliability desired and needed by a thirsty world. While research in SWRO continues and there is hope that the process can be further refined, the question must be asked whether the fascination with that process may have blocked out other worthy processes, such as, for example, freezing.

Freezing systems for the desalination of seawater created a lot of interest several decades ago. Freezing seawater produces pure ice that is salt free. That interest has waned in the face of successful innovations of other technologies that have the allure of being newer processes. Distillation and reverse osmosis systems are among these.

Freezing technology reached its high point in popularity and interest some fifty years ago. This was due to the inherent efficiency of the freezing process that requires merely one sixth of the energy when compared to simple distillation, requiring roughly 150 btu/lb to freeze water as compared to 1000 btu/lb to vaporize water, as may be required in distillation processes. The low operating temperature of the freezing process enhanced its attractiveness because it reduced corrosion, requiring less costly materials of construction. But its greatest allure, for both small and large-scale operation, was the fact the equipment components and designs for freezing had a long history of trouble free operation as evidenced by the many refrigeration installations within most industries all over the world.

The U.S. government funded desalination research when it established the Office of Saline Water (OSW). From the late 1950's to 1980, the OSW appropriated some $160 million to desalination research. Distillation processes had not fully blossomed to their present state. Membrane processes had not yet surfaced, though ultimately they emerged as part of this funding. Several variations of the freezing process were developed, and many systems have been proposed to achieve an economical salt-water freezing process (ice or hydrate). Some of these processes use a refrigerant to chill the saline waters to form an ice or hydrate slush by either direct contact of refrigerant with saline water or by indirect heat exchange. For example, the process in U.S. Pat. No. 3,213,633 uses direct heat exchange of a C1-C5 refrigerant, including fluoro- and chloro-carbons. Others use evaporative cooling to obtain ice, the water being evaporated under vacuum thereby inducing freezing of the seawater.

Because the money was available from the government, there was a rush to build large demonstration plants without the benefit of extensive piloting on a small scale. Approximately a dozen diverse freeze demonstration plants were constructed, some located at the OSW Wrightsville Beach Test Facility in North Carolina and one plant was built in St. Petersburg, Fla. Additionally, the OSW provided financial assistance to a demonstration plant built in Israel using the Zarchin Process. That plant operated for two years providing water to a nearby town.

All of the projects experienced major difficulties at first. After start-up, plant modifications needed to be made. Budgets and schedules fell to the wayside due to the required design changes, which on a large-scale are expensive and time consuming. Once these plants were operating, it became evident that harvesting the ice from the brine was a serious problem. Ice crystals form as flat platelets, of irregular shape, preventing the mother liquor brine from draining freely. Mother liquor adheres to the crystal surfaces and interstices. The brine and ice form a slush that resists proper separation. Upon melting, the resulting water contains the salt of the adhering brine.

Unfortunately, the problem of how to separate easily the ice from the residual brine proved to be an obstacle that detracted from the overall appeal of the freezing process. Desalination plants, using the freezing process, never expanded beyond small units, which at best were only pilot units under different names. The main limiting problem to a practical concept, suitable for large-scale operation, was the hurdle presented by the harvesting of ice, prior to its melting, to produce fresh water. Numerous means for separating ice and brine were tried including filtration, centrifuging or similar operations all of which yielded frustrating results. The most successful apparatus was a wash column, developed by Prof. Wiegandt at Cornell University, in which a solid column of ice is pushed upwards by hydraulic pressure. As the ice reaches the top of the column, a mechanical device, scrapes and cuts the ice, dropping it into a melter from which pure water product is withdrawn. Some of the product is recycled to the top of the column for washing. The brine leaves at the bottom of the column. This apparatus produces pure water. However, it is awkward and cannot be scaled up to large capacities.

Ice separation has been the greatest impediment in the development of the freezing process and has proven to be a limiting factor in the design of large capacity plants, to cause acute trouble spots in the process, to require constant supervision, labor and high maintenance. The problems encountered gave the freezing process a bad reputation, curtailing research in this area.

SUMMARY OF THE CLAIMED EMBODIMENTS

A novel concept for ice separation from brine or other liquids has now been discovered, which has the potential of repositioning the freezing process into a preeminent position and of becoming the process of choice for the production of water from seawater, brackish water, or other types of saline solutions suitable for human consumption or other uses, or for the desalination of waters produced from oil, gas, and mining operations, or for the dehydration of water containing mixtures for the purpose of reducing the residual volume or for the recovery of salts or minerals. This concept is applicable to a wide range of capacities from large-scale plants for municipal and regional use, to intermediate size modular units for industrial, agricultural, military and marine applications, and for disaster relief, to small package units for domestic use, similar in size to home air conditioning units or water chillers. The process includes separation of the ice from the brine by flotation using a liquid, immiscible with water, having a specific gravity higher than that of ice but lower than water. In this manner, the immiscible liquid forms a slush or slurry with the ice, enabling separation of the ice from the brine, transport of the ice slurry, and recovery of the purified water.

In one aspect, embodiments disclosed herein relate to a process for purifying water. The process may include: contacting an aqueous mixture with a flotation medium, wherein the flotation medium has a density greater than or equal to the density of ice or hydrate and less than the density of the aqueous mixture or concentrated brine at its freezing point; reducing the temperature of the aqueous mixture to a temperature equal to or below the freezing point of the aqueous mixture to form ice or hydrate and a concentrate; phase separating the concentrate and the flotation medium; recovering the concentrate; and recovering the ice or hydrate and flotation medium as a slurry. In some embodiments, the flotation medium may have a density in the range from about 0.8 to about 1.0 g/cc.

The process may further include one or more of the following steps: melting the ice in the slurry of ice in flotation medium to form an aqueous fraction comprising water; separating the aqueous fraction from the flotation medium; washing the slurry with a wash liquid comprising at least one of fresh water, the aqueous fraction, and flotation medium, which may be the same or different than the flotation medium used in the contacting step; adding to the wash liquid one or more additives improving the displacement of concentrate adhering to the ice surfaces.

In one or more embodiments, the temperature of the wash liquid is varied to enhance the displacement of concentrate adhering to the ice. In one or more embodiments, the temperature of the aqueous mixture is reduced by direct heat exchange, indirect heat exchange, or a mixture thereof, or by vacuum evaporation of some water contained in the mixture. For example, in some embodiments, the temperature of the aqueous mixture is reduced by direct heat exchange, indirect heat exchange, or a mixture thereof, with at least one of liquid natural gas (LNG), expanded LNG, ethane, propane, ethylene, and propylene.

In some embodiments, the contacting and temperature reducing steps are performed at the same time. In other embodiments, the contacting step is performed prior to the temperature reducing step.

In some embodiments, the process may also include one or more of the following steps: contacting the flotation medium-ice slurry with a fluid having a higher density than the flotation medium; displacing adhering or occluded concentrate into the concentrate; and phase separating the flotation medium/ice, the fluid, and the concentrate.

In some embodiments, the process may also include one or more of the following steps: contacting the recovered concentrate with a second flotation medium, which may be the flotation medium, wherein the second flotation medium has a density greater than or equal to 0.8 and less than the density of the concentrate at its freezing point; reducing the temperature of the concentrate to a temperature equal to or below the freezing point of the concentrate to form ice or hydrate and a second concentrate; phase separating the second concentrate and the second flotation medium; recovering the second concentrate; and recovering the ice or hydrate and second flotation medium as a slurry; forming a precipitate while removing heat from the aqueous mixture; forming a second precipitate during further heat removal from the concentrate. When formed, the precipitate may be a different salt or a different metal or mixtures of salt and/or metals than the second precipitate.

In some embodiments, the process may be used to recover a purified water product stream, wherein the purified water recovered is greater than 85% of the water contained in the original aqueous mixture.

In some embodiments, processes disclosed herein may also include one or more of the following steps: (a) determining a ratio of brine adherence to ice for a given aqueous mixture as a function of one or more of aqueous mixture composition, freezing rates, flotation medium feed rate, flotation medium feed temperature, flotation medium, aqueous mixture feed temperature, aqueous medium feed rate, water wash temperature, and water wash rate; (b) calculating the number of theoretical transfer units to result in a desired water purity or water recovery percentage for the aqueous mixture; (c) determining a height of a theoretical transfer unit for the aqueous mixture; (e) determining a feed location for the aqueous mixture and/or the flotation medium, based on one or more of the determined height, the determined brine adherence ratio, the calculated number of theoretical transfer units, desired concentrate slurry concentration, desired water purity, desired water recovery percentage, freezing temperature, minimum flotation medium temperature, and mixture eutectic temperature; (f) adjusting a temperature of the flotation medium and/or the water wash based on the determined ratio of brine adherence; and (g) adjusting a flow rate of the water wash, the flotation medium, and the brine based on the determined ratio of brine adherence.

In another aspect, embodiments disclosed herein relate to a method of designing a water purification system. The method may include: (a) determining a ratio of brine adherence to ice for a given aqueous mixture, as a function of one or more of aqueous mixture composition, freezing rates, flotation medium feed rate, flotation medium feed temperature, flotation medium, aqueous mixture feed temperature, aqueous medium feed rate, water wash temperature, and water wash rate; (b) calculating a number of theoretical transfer units to result in a desired water purity for the aqueous mixture; (c) determining a height of a theoretical transfer unit for the aqueous mixture; and (d) designing or constructing a water purification process using one or more countercurrent flow columns having a height or combined height equivalent to or within 20% of the determined height multiplied by the number of theoretical transfer units.

In another aspect, embodiments disclosed herein relate to an apparatus for purifying water. The apparatus may include: a flow conduit or column for contacting an aqueous mixture with a flotation medium, wherein the flotation medium has a density greater than or equal to 0.8 and less than the density of the aqueous mixture or concentrated brine at its freezing point; a direct or indirect heat exchange system for reducing the temperature of the aqueous mixture to a temperature equal to or below the freezing point of the aqueous mixture to form ice or hydrate and a concentrate; at least one phase separator for phase separating the concentrate and the flotation medium; a flow conduit for recovering the concentrate; and a flow conduit for recovering the ice or hydrate and flotation medium as a slurry.

The apparatus may also include one or more of the following: a direct or indirect heat exchange system for melting the ice to form an aqueous fraction comprising water; a separator for separating the aqueous fraction from the flotation medium; a flow conduit for introducing a wash fluid for washing the slurry with at least one of fresh water, the aqueous fraction, and flotation medium, which may be the same or different than the flotation medium used in the contacting step; a flow conduit or column for contacting the concentrate with a second flotation medium, wherein the second flotation medium has a density greater than or equal to 0.8 and less than the density of the concentrate at its freezing point; a direct or indirect heat exchange system for reducing the temperature of the concentrate to a temperature equal to or below the freezing point of the concentrate to form ice or hydrate and a second concentrate; at least one phase separator for phase separating the second concentrate and the second flotation medium; a flow conduit for recovering the second concentrate; and a flow conduit for recovering the ice or hydrate and second flotation medium as a slurry.

Other aspects and advantages will be apparent from the following description and the appended claims.

DETAILED DESCRIPTION

Figure 1B:
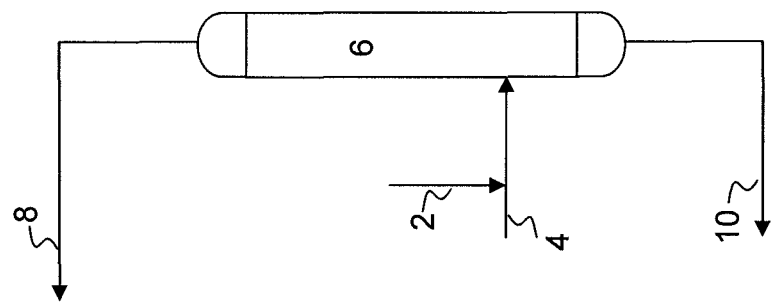
FIGS. 1A-1F are simplified process flow diagrams of processes for purifying water according to embodiments disclosed herein.

In one aspect, embodiments herein relate generally to a process for purifying or partially purifying impure waters, such as brine or other aqueous mixtures containing various salts, heavy metals, or other impurities. Processes disclosed herein may also be used to reduce the water content of aqueous mixtures, such as for the concentration of fruit juices, alcoholic beverages, coffee, and tea, among others. In another aspect, embodiments disclosed herein relate to processes for recovering metals or salts dissolved in aqueous solutions.

As used herein, the terms "seawater", "brackish water", "produced water", "brine," "contaminated water," and "aqueous mixture" may be used interchangeably. "Seawater", "brackish water", "produced water" will generally refer to saline solutions where the predominant dissolved salt is sodium chloride, though other compounds, in smaller quantities, may also be present. The term "brine" as used herein refers to aqueous solutions comprising water and at least one salt. The at least one salt may include: one or more salts such as at least one of an alkali metal halide, an alkaline earth metal halide, and a transition metal halide, where the halide may include fluorine, chlorine, bromine, or iodine, for example; minerals. Additionally, there could be compounds of oxides, sulfates, organic and inorganic compounds The terms "contaminated water" and "aqueous mixture" as used herein refer to aqueous solutions or mixtures including one or more components in solution or suspension, including contaminants such as minerals, metals, flavorings (e.g., acids and other compounds commonly found in tea, coffee, orange juice, beer, etc.), and various additives used in the drilling and production of oil (wetting agents, viscosifiers, etc.), among others. Aqueous mixtures according to embodiments herein may thus include seawater, brackish water, pond water, produced water (e.g., water produced during drilling or production of oil) and other aqueous byproducts of oil and gas operations, tea, coffee, orange juice, urine, and numerous other water streams or water sources including various contaminants.

As noted above, one of the major failings of prior art freezing processes was due to the difficulties encountered with ice separation. It has now been found that separation of the ice from concentrates may be performed by flotation using a flotation medium, herein defined as a liquid, immiscible or substantially immiscible with water, having a density higher than or equal to that of ice but lower than that of the concentrate or the brine. The flotation medium and ice are recovered as a slurry or a slush, providing for ease of separation from the brine, transport of the ice slurry, and recovery of the purified water. The use of an immiscible liquid and recovery of an ice-water-immiscible liquid slurry will also tend to reduce the amount of occluded brine.

Referring now to FIGS. 1A-1F, wherein simplified process flow diagrams of water purification processes according to embodiments disclosed herein are illustrated, where like numerals represent like parts. In the discussions hereafter, the terms "crystallizer" and "crystallizer-wash column" are used interchangeably and refer to equipment 6. An aqueous mixture 2, such as seawater, is contacted with a flotation medium 4 in a crystallizer-wash column 6. The temperature of the aqueous mixture is chilled to a temperature below the freezing point of the aqueous mixture, either in the crystallize-wash column 6 or prior to entering it, resulting in the formation of ice (or a hydrate) and a concentrate (e.g., an aqueous mixture having a higher concentration of salts or other contaminants than the feed aqueous mixture).

Ice has a density typically in the range from about 0.88 g/cc to about 0.92 g/cc, depending upon the temperature, the manner in which the ice was formed, and the components of the aqueous mixture. The aqueous mixture may have a density in the range from about 0.98 to about 2 g/cc or greater, typically in the range from about 0.98 to about 1.2 g/cc for sea water or other salt-containing aqueous mixtures. The flotation medium should thus have a density within that range, such as from about 0.8 to about 1.0 g/cc in some embodiments, at the prevailing operating temperatures, and densities of the mixture treated, to facilitate separation of the ice crystals from the concentrate. In other embodiments, the flotation medium may have a density in the range from about 0.88 to about 0.98 g/cc; and from about 0.9 to about 0.95 in yet other embodiments.

Figure 1A:
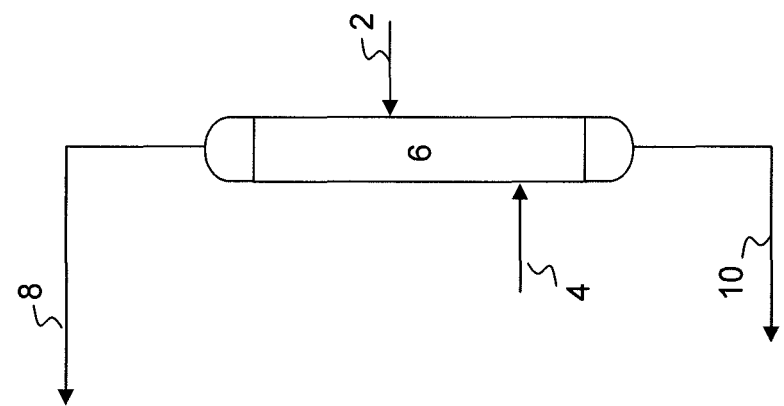
Figure 1D:
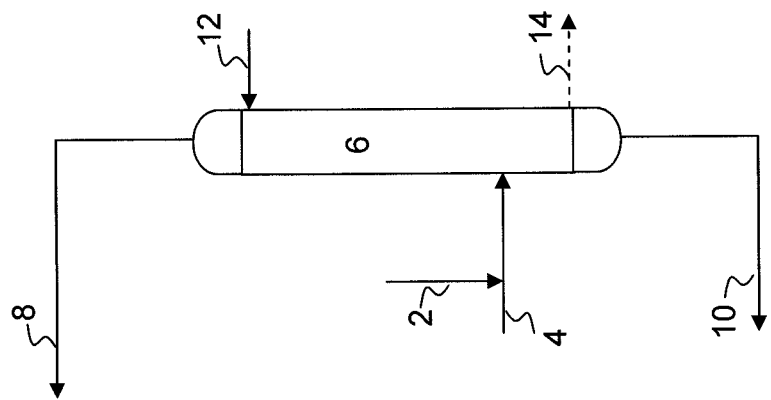

The aqueous mixture and flotation medium may be fed to crystallizer-wash column 6 separately, as illustrated in FIG. 1A, or together, as illustrated in FIG. 1B. Upon reduction of the temperature of the aqueous mixture to below its freezing point, ice crystals form. The ice and flotation medium, having a lower density, traverse upward through the crystallizer-wash column 6, while the concentrate, having a higher density, traverses downward through the column. The ice-flotation medium slurry may then be recovered from crystallizer-wash column 6 via streams 8, and the concentrate may be recovered via stream 10. The ice-flotation medium slurry may then be processed further to recover purified water, as will be described below in more detail.

Cooling of the aqueous mixture may be accomplished via direct or indirect heat exchange, or a combination thereof. It may be performed upstream of the crystallizer or within the crystallizer, or a combination thereof. The coolant could be a refrigerant or any non-refrigerant cooling medium, such as, for example, the sub-cooled flotation medium. Alternatively, cooling could be achieved by causing evaporation of part of the aqueous mixture by subjecting it to a vacuum.

For example, for the process as illustrated in FIG. 1A, the aqueous mixture may be fed to the crystallizer and contacted with a flotation medium at a temperature lower than the freezing point of the aqueous mixture. Direct heat exchange of the down-flowing aqueous mixture with the up-flowing flotation medium may then result in a decrease in the temperature of the aqueous medium to less than its freezing point, and the formation of ice. In such an embodiment, there will be a temperature gradient from the bottom to the top of the crystallizer 6, where the temperature increases gradually from bottom to top, due to direct contact and heat exchange between the aqueous mixture feed and the flotation medium and the changing concentration of the brine. In its upward flow, the flotation medium chills the incoming aqueous mixture. As ice forms, the concentration of the brine increases and the freezing point gradually drops as the brine descends toward the bottom of crystallizer 6. The up-flowing flotation medium sweeps the ice platelets and crystals upwards because they are lighter than either the concentrate or the flotation medium. The ice platelets and crystals grow while ascending and contacting incoming aqueous mixture. At the top, the flotation medium and ice form a slush, which may be easily recovered.

Figure 1C:
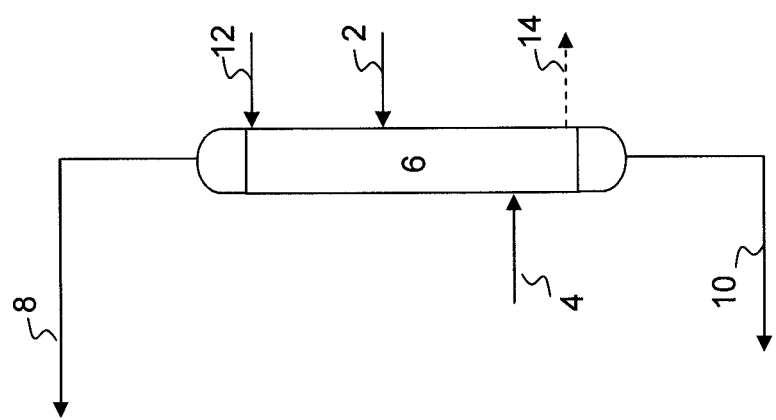

In some embodiments, it may be desirable to wash the ice slush to displace any residual or adhering contaminants (e.g., adhering salt brine). Wash liquids may be, for example, fresh water, a portion of the melted ice, recovered water from further processing of stream 10, additional flotation medium, or a fluid of or higher density than the concentrate or of an intermediate density between that of the flotation medium and the concentrate. In some circumstances, it may be advantageous to add small quantities of one or more additives to the wash liquid, such as a surfactant, to lower the surface tension between ice and adhering brine, improving the displacement of concentrate adhering to the ice surfaces. As illustrated in FIG. 1C, the wash liquid may be fed to the crystallizer-wash column 6 via stream 12, where stream 12 is located at a point above the aqueous mixture feed location, where the ice and flotation medium have been sufficiently separated from the concentrate. Contact and mixing of the slurry with the wash fluid may thus displace residual, adhering, or occluded contaminants, which then traverse downward through the crystallizer-wash column, resulting in a higher purity water product.

The wash liquid may be at a temperature less than, equivalent to, or greater than that of the slurry. In some embodiments, the wash liquid is at a temperature slightly higher than that of the slurry, and in some embodiments it is higher than the melting point of the ice, thus promoting melting of a portion of the ice, facilitating the separation of the occluded or entrained contaminants from the ice crystals. When the wash liquid is water, or a liquid lighter than water, the wash liquid may be recovered with the ice slush via stream 8, but if the wash liquid is of higher density than water it may be recovered with the concentrate via stream 10 and may then be subsequently separated, if desired. Alternatively, following settling of the various density fluids in the bottom of crystallizer-wash column 6, the concentrate may be recovered via stream 10 and the wash liquid may be recovered via stream 14, or vice versa, depending on the density of the wash liquid.

Figure 1F:
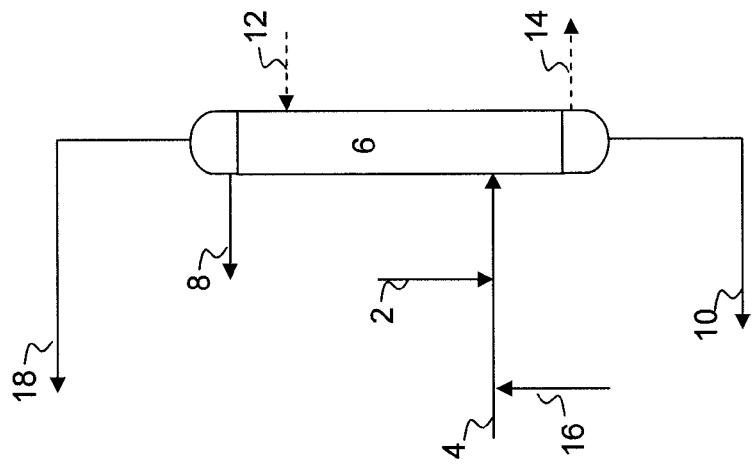
Figure 1E:
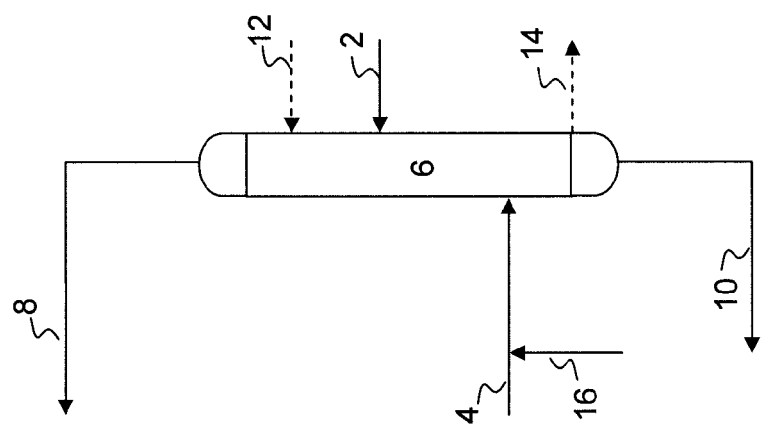

In some embodiments, cooling or additional cooling of the aqueous mixture may be achieved by use of a refrigerant. For example, as illustrated in FIGS. 1E and 1F, liquefied natural gas or other refrigerants or mixtures of refrigerants may be fed via flow line 16 to crystallizer 6. While illustrated as being combined with the flotation medium, the refrigerant may additionally or alternatively be fed directly to crystallizer 6. Expansion of the refrigerant and contact of the aqueous mixture in crystallizer 6 with the expanded refrigerant and the flotation medium may thus reduce the temperature of the aqueous mixture below its freezing point. In such embodiments, the expanded refrigerant may be recovered along with the ice-flotation medium slurry via flow line 8, FIG. 1E. Alternatively, as illustrated in FIG. 1F, the upper portion of crystallizer-wash column 6 may include a degassing zone, allowing for recovery of the expanded refrigerant via flow line 18. Downstream processing of the slurry may also need to include additional degassing to allow for separation of entrained refrigerant.

As described above with respect to FIGS. 1A-1F, various methods may be used to freeze a portion of the water from an aqueous mixture, where each advantageously recovers the ice as a slurry with the flotation medium. Although not illustrated, various upstream and downstream processing may be used to facilitate the recovery of a purified water product stream, including holding tanks and recirculation loops to promote nucleation and increase residence time for crystal growth, washing of the slurry to remove adhering or occluded contaminants, melting of the ice to form an aqueous fraction comprising water (e.g., purified water or water of a higher purity than the feed aqueous mixture), separation of the water or aqueous fraction from the flotation medium, cooling of the flotation medium or the feed aqueous mixture, recycle of water product or flotation medium as a wash liquid, upstream filtration, degassing, or other processing of the feed aqueous mixture, and concentrate processing. Various other upstream and downstream processes that may be commonly used for water purification facilities may also be used. Additionally, warming of the slush to melt the ice may be performed in conjunction with cooling of various feed streams, thereby gaining energy efficiencies for the process. Embodiments of processes according to embodiments disclosed herein including these further features are described in more detail below.

Figure 2:
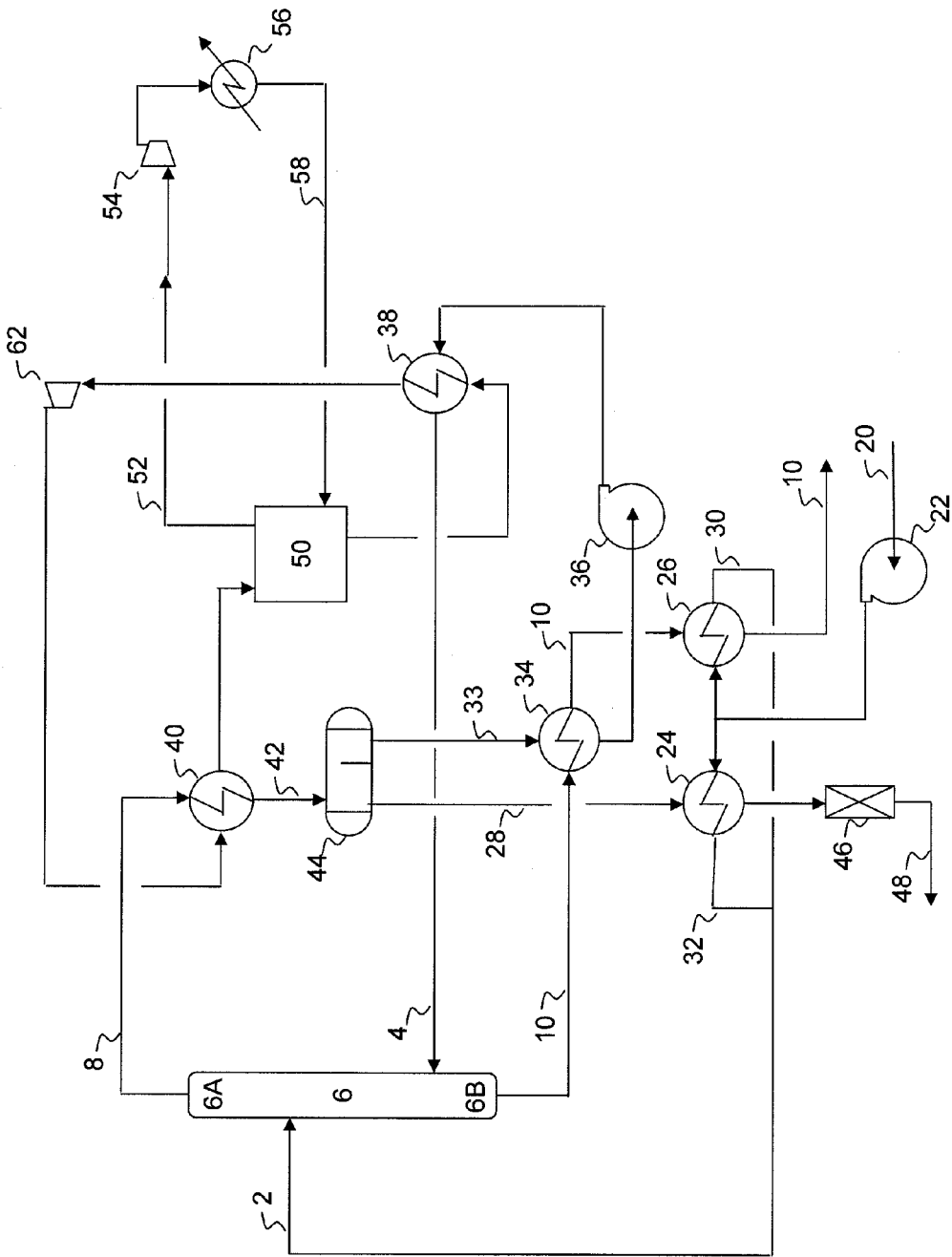
FIGS. 2-8 are simplified process flow diagrams of processes for purifying water according to embodiments disclosed herein.

Referring now to FIG. 2, a process for recovering purified water from an aqueous mixture according to embodiments disclosed herein is illustrated, where like numerals represent like parts. Brine stream 20 is fed to the system by pump 22 and is passed through two exchangers in parallel 24, 26 wherein it is chilled, respectively, by product water 28 and product concentrate 10. The cooled brine feed in resulting parallel feed streams 30, 32 are recombined at the exit of the exchangers 24, 26 and the cooled brine feed is introduced into crystallizer-wash column 6 via feed stream 2.

The flotation medium is circulated via flow stream 33 and is pre-cooled via indirect heat exchange with product concentrate 10 in exchanger 34 and is pumped by pump 36 through refrigerant evaporator 38 wherein it is further chilled to a temperature below the freezing point of the brine. The chilled flotation medium is then fed via flow stream 4 to crystallizer-washer column 6 where it is contacted directly with downward flowing brine.

Ice nuclei form in the crystallizer 6 upon contact of the brine with the chilled flotation medium. There is a marked temperature gradient between top and bottom of crystallizer 6. The temperature increases gradually from bottom to top, due to direct contact and heat exchange between brine feed and cold flotation medium. Flotation medium is lighter than the brine and therefore ascends while the brine flows downwards. In its upward flow, the flotation medium chills the incoming brine. As ice forms, the concentration of the brine increases and the freezing point gradually drops as the brine descends toward the bottom of crystallizer 6. The up-flowing flotation medium sweeps the ice platelets and crystals upwards because they are lighter than either the brine or the flotation medium. The ice platelets and crystals grow while ascending and contacting incoming brine. At the top of crystallizer-wash column 6, flotation medium and ice slush enter calming chamber 6A, designed to achieve satisfactory separation of the ice from adhering brine. In some designs, it may be advisable to flush the ice slush with a recycle stream of product water to better displace any residual adhering saltwater. Flotation medium and ice exit calming chamber 6A via flow line 8 as a slurry and are fed to primary refrigerant condenser 40.

The concentrated cold brine leaves calming chamber 6B, designed to achieve satisfactory phase separation of the concentrated brine from the flotation medium. The concentrate is then recovered via flow stream 10 and heat exchanged against flotation medium and feed brine in exchangers 34, 26 as described above.

The flotation medium and ice slush exiting calming chamber 6A flow through primary refrigerant condenser 40. The ice melts by heat-exchange with refrigerant that is partially condensed. The flotation medium and melted ice water then flow via flow stream 42 into separator 44 where flotation medium and water are allowed to separate into two liquid layers based on density, the flotation medium being lighter than water. The separated water may then be recovered as a product via flow line 28 and passed through exchanger 24 as described above. The recovered water may also be passed through activated charcoal in vessel 46, where any traces of flotation medium that may have been entrained with the water product are removed, resulting in a purified water product stream 48. Flotation medium may be recovered from separator 44 via flow stream 33, and passed through exchanger 34, pump 36, and exchanger 38, as described above.

Primary refrigerant condenser 40 partially condenses circulating refrigerant and melts the ice in the flotation medium-ice slush. Refrigerant collects in refrigerant storage tank 50, where refrigerant liquid and vapors separate. The non-condensed refrigerant vapors leave refrigerant storage tank 50 via flow line 52 and are compressed in secondary refrigerant compressor 54, condensed in secondary refrigerant condenser 56, and returned as liquid to refrigerant storage tank 50 via flow line 58. Air, cooling water, or any other suitable fluid such as waste brine may be the cooling medium in refrigerant condenser 56. The liquid refrigerant flows from refrigerant storage tank 50 to refrigerant evaporator 38 to chill the flotation medium, as previously described. Primary refrigerant compressor 62 raises the pressure of refrigerant vapors exiting refrigerant evaporator 38 to a pressure high enough to permit partial condensation of refrigerant in primary refrigerant condenser 40, thereby melting the ice in the flotation medium-ice slush, as previously described.

The configuration shown in FIG. 2 is only one of many design configurations using flotation medium to obtain potable water by freezing brine and recovering the ice as a slurry with a flotation medium. Different equipment and different equipment arrangements may also be used to maximize the thermodynamic efficiency of the process and optimize system cost as a function of capacity or ease of operation, as may be readily envisioned by those of ordinary skill in the art, some of which may be outlined by the processes described below.

Figure 3:
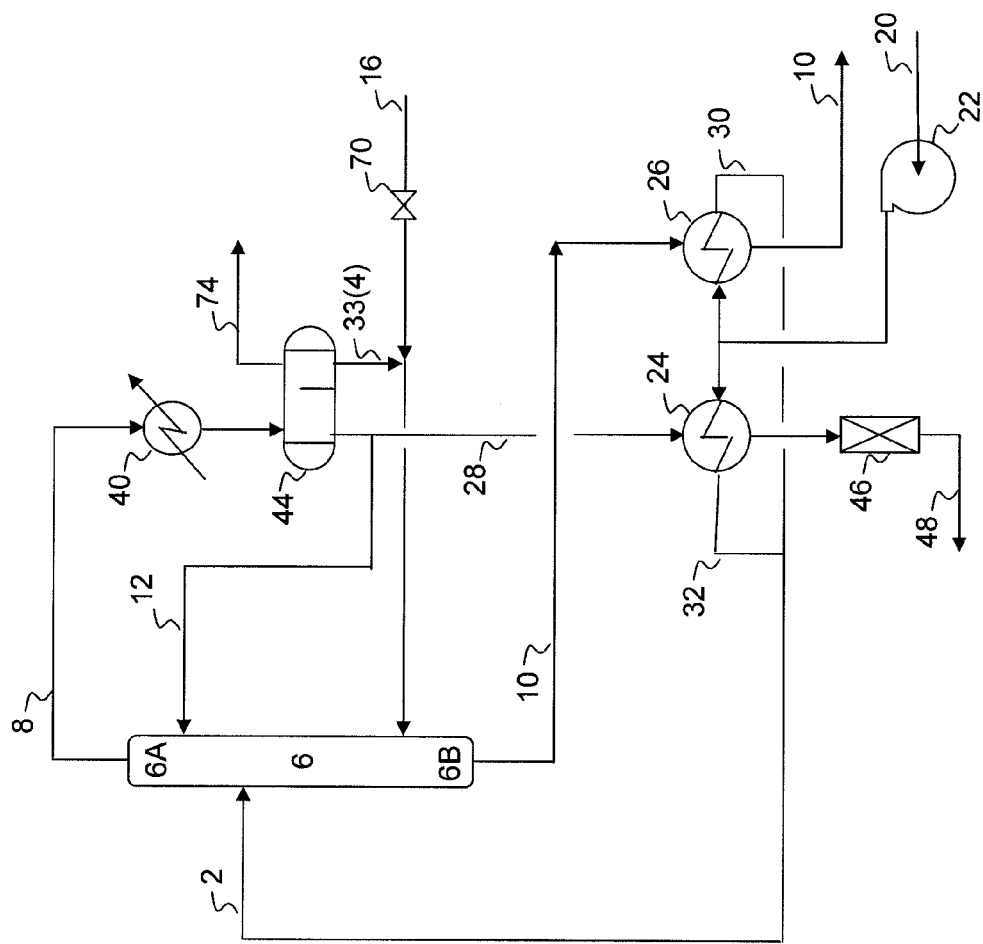

Referring now to FIG. 3, a process for recovering purified water from an aqueous mixture according to embodiments disclosed herein is illustrated, where like numerals represent like parts. In this embodiment, refrigeration and cooling of the flotation medium is provided by direct heat exchange with a refrigerant, such as liquefied natural gas (LNG), and is processed through crystallizer-wash column 6 similar to that described above for FIG. 1E. The crystallizer-wash column is operated at a pressure slightly higher than the pipeline pressure into which the vaporized LNG is fed upon exiting the water purification unit via line 74.

Brine feed 20 is split into two streams and fed to two parallel heat exchangers 24, 26. The two feed streams are cooled in exchangers 24, 26 respectively by indirect heat exchange with the produced concentrate stream 10 and the product water stream 28. The cooled feed streams 30, 32 enter crystallizer-wash column 6 via flow line 2. Alternatively, feed streams 30, 32 may be fed to crystallizer 6 separately, where the entry point locations may depend on the temperature and concentration of the feed.

LNG is fed via flow line 16 and mixed with recirculating flotation medium in stream 4 recovered from separator 44. Alternatively, LNG may be added directly to crystallizer-wash column 6 without prior mixing with recirculating flotation medium, stream 4. Prior to mixing with the recycled flotation medium or entering directly into crystallizer 6, the LNG may Pass through an expansion valve 70. Upon mixing, the LNG chills the flotation medium. The mixed stream enters crystallizer-wash column 6 near the bottom of the column but above calming section 6B, designed to allow settling of concentrated brine to avoid entraining flotation medium as it exits the bottom of crystallizer 6. Ice forms as the chilled flotation medium and LNG contact the brine flowing downwards within crystallizer 6. The expanded LNG, flotation medium and ice flow upwards to the top of the column where they are recovered via flow stream 8. Alternatively, LNG and the ice-flotation medium slurry may be recovered separately as shown in FIG. 1F. After having been flushed with recycle product water originating from separator 44 and fed via flow line 12 to crystallizer-wash column 6, the ice-flotation medium slurry and vaporized LNG are then fed to exchanger 40.

The ice melts in exchanger 40 by heat exchange against cooling water or against any other heat exchange medium. The molten ice, flotation medium, and expanded LNG are then fed from exchanger 40 to separator 44 where they are separated. The expanded LNG is recovered via flow line 74 and may be fed into the pipeline system. The flotation medium is recycled via flow line 4, as previously described, and the molten ice, now product water, is withdrawn via flow stream 28. The separated water may then be recovered as a product via flow line 28 and passed through exchanger 24 as described above. The recovered water may also be passed through activated charcoal in vessel 46, where any traces of flotation medium that may have been entrained with the water product are removed, resulting in a purified water product stream 48.

Figure 4:
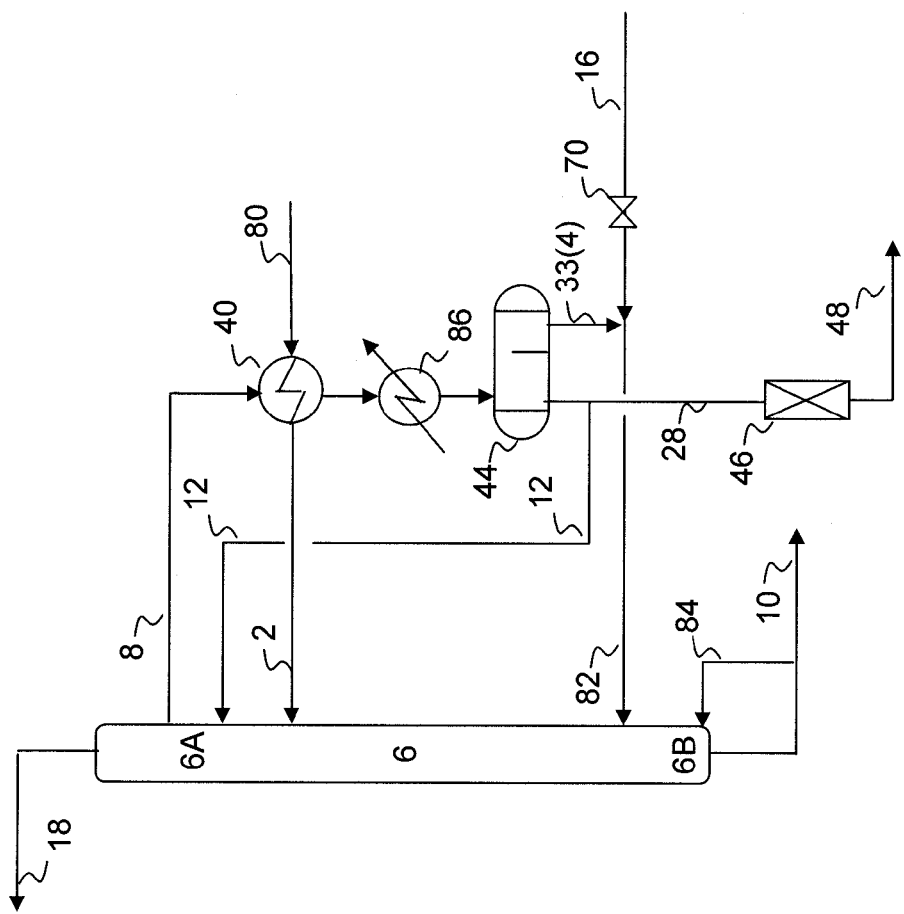

Referring now to FIG. 4, a process for recovering purified water from an aqueous mixture according to embodiments disclosed herein is illustrated, where like numerals represent like parts. In this embodiment, refrigeration and cooling of the flotation medium is provided by direct heat exchange with a refrigerant, such as liquefied natural gas (LNG), and is processed through crystallizer 6 similar to that described above for FIG. 1F. Additional heat may also be recovered via exchange of heat from the feed brine 80 to melt the ice slurry. While the embodiment of FIG. 4 may be used for virtually any aqueous mixture, it is described herein with respect to produced water recovered from an oil production site.

Clarified and clean produced water enters the water purification process via flow stream 80 and is cooled in melter 40 by indirect heat exchange, melting ice originating from flotation medium-ice mixture 8 recovered from crystallizer-wash column 6. The cooled produced water feed 2 enters the crystallizer 6 at an entry point location above the flotation medium, which may be dependent on its concentration and temperature. Upon entering crystallizer 6, the produced water flows downward while contacting up flowing flotation medium, expanded natural gas and ice. There is a temperature gradient from top to bottom of the column. As ice forms, the residual saline solution becomes more concentrated as it descends the column and its freezing temperature decreases. LNG and flotation medium enter the bottom of the column via flow line 82 in quantities sufficient to cool the bottoms to the eutectic temperature and to the desired concentration of salt precipitates. Salt and brine are heavier than flotation medium, ice and expanded LNG. Accordingly, the various phases disengage in accordance with their densities. Expanded LNG, flotation medium and ice flow upward in crystallizer 6, and the concentrated produced water and precipitates flow downward in crystallizer 6.

The precipitates and concentrate collect in settler 6B where any entrained flotation medium is disengaged. A portion of the slurry recovered from settler 6B may be recirculated via flow line 84 (using appropriate solids handling pumps, not shown) to prevent precipitates settling from the slurry. Part of the circulating stream leaves the system as concentrated produced water stream 10 (concentrate stream 10).

Expanded LNG exits the top of crystallizer 6 via flow stream 18 to enter the pipeline system after disengaging in section 6A from the mixture of ice and flotation medium. Ice and flotation medium overflow are recovered as a slurry via flow stream 8 and fed to melter 40 where the ice is partially melted by heat exchange with incoming feed produced water. Complete melting occurs as it passes through secondary melter 86. The flotation medium and molten ice enter separator 44, where the phases separate, and are recovered and processed similar to that described for FIG. 3.

Figure 5:
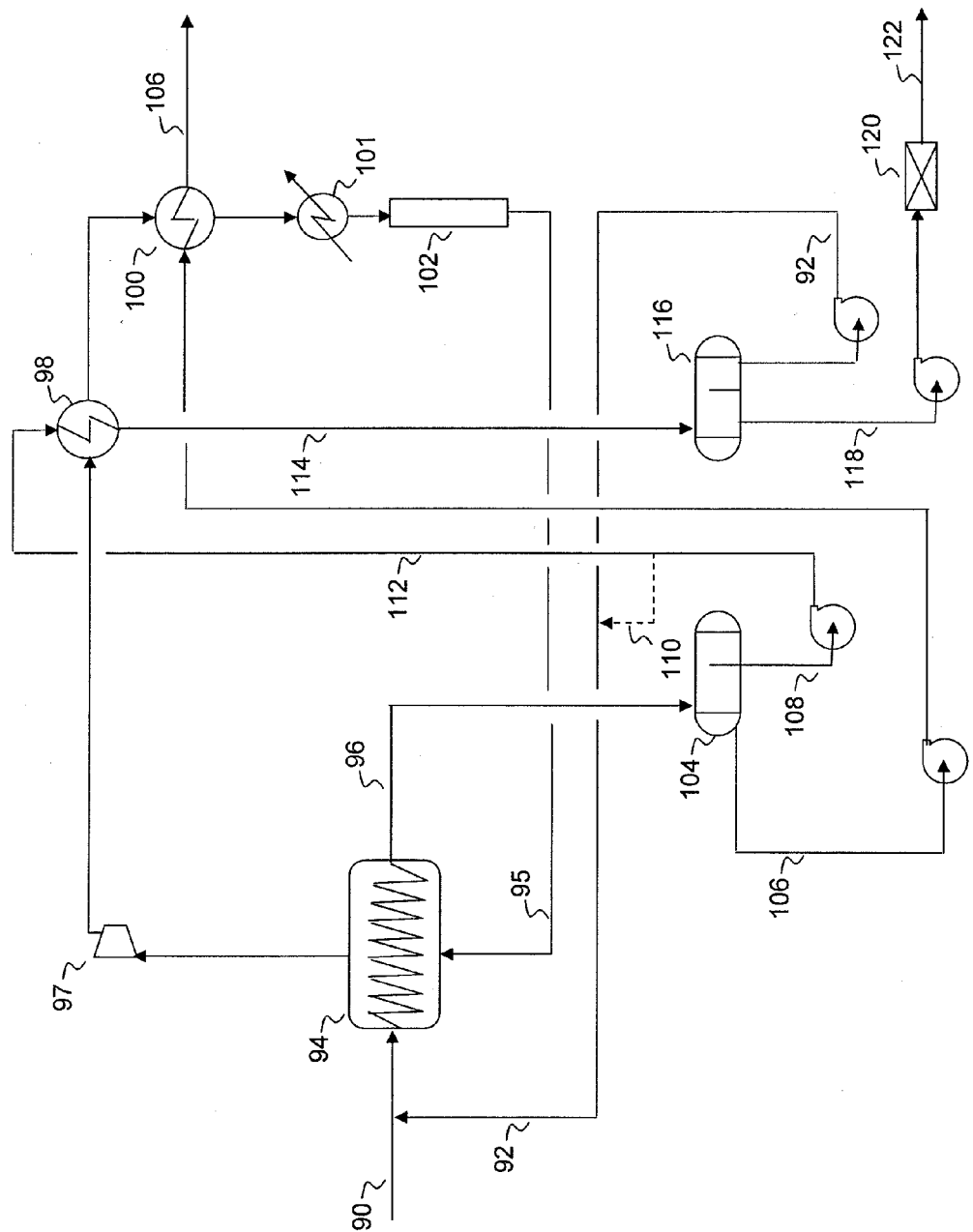

Referring now to FIG. 5, a process for recovering purified water from an aqueous mixture according to embodiments disclosed herein is illustrated. In this embodiment, the brine and flotation medium are chilled to freeze a portion of the water followed by subsequent separation of the ice, brine, and flotation medium, as opposed to use of a crystallizer-wash column.

Brine feed 90 at ambient temperature is mixed with a stream of recirculating flotation medium 92. The combined streams enter evaporator 94 where the mixture is chilled to a temperature below the freezing point of the brine via indirect heat transfer with a refrigerant fed via flow line 95. The temperature at the outlet of evaporator 94 (effluent stream 96) depends on the composition of the brine and the desired amount of concentration, and may be controlled to achieve a desired waste brine concentration and to promote ice crystal and platelet formation in evaporator 94.

The refrigerant in evaporator 94 is part of a refrigeration cycle consisting of compressor 97, primary condenser 98, partial refrigerant condenser 100, secondary refrigerant condenser 101, and refrigerant tank 102. Additional components may also be used in the refrigeration cycle, such as a secondary compressor, degas tank or other apparatus known to those of ordinary skill in the art.

The refrigerated slush of ice, flotation medium, and brine is recovered from evaporator 94 via flow stream 96 and is fed to brine separator 104. As both the flotation medium and ice are lighter than brine, the components of the mixture separate into layers of different specific gravities. The heaviest layer at the bottom of separator 104 is the brine, recovered via flow stream 106. The cool brine concentrate in stream 106 may then be used as a coolant in condenser 100 and passed through a charcoal filter (not shown) to remove any entrained filtration medium, the warmed brine concentrate product being recovered by flow stream 106.

The upper layer(s) in brine separator 104, consisting of flotation medium and ice, are withdrawn from separator 104 as a slurry via flow line 108 and may be split into two streams, 110, 112. Optional recycle stream 110 may be mixed with recirculating flotation medium in stream 92 and then further mixed with feed brine 90 to pre-cool the feed brine. Slurry flow 112 is passed through primary condenser 98, where the ice is melted by heat exchange with condensing refrigerant. The warmed water-flotation medium mixture is then fed via flow line 114 to product separator 116, where the melted ice water and flotation medium separate into two layers, due to the differences in their specific gravity. Both the brine separator 104 and the product separator 116 are designed with appropriate internals and residence times to allow for adequate separation of the phases.

The flotation medium is withdrawn as the upper layer from separator 116 via flow line 92 and mixed with brine feed and slurry recycle, as previously described. The purified water product, the lower layer in product separator 116, is recovered via flow line 118, passed through charcoal filter 120, and is recovered as a product stream via flow line 122.

Figure 6:
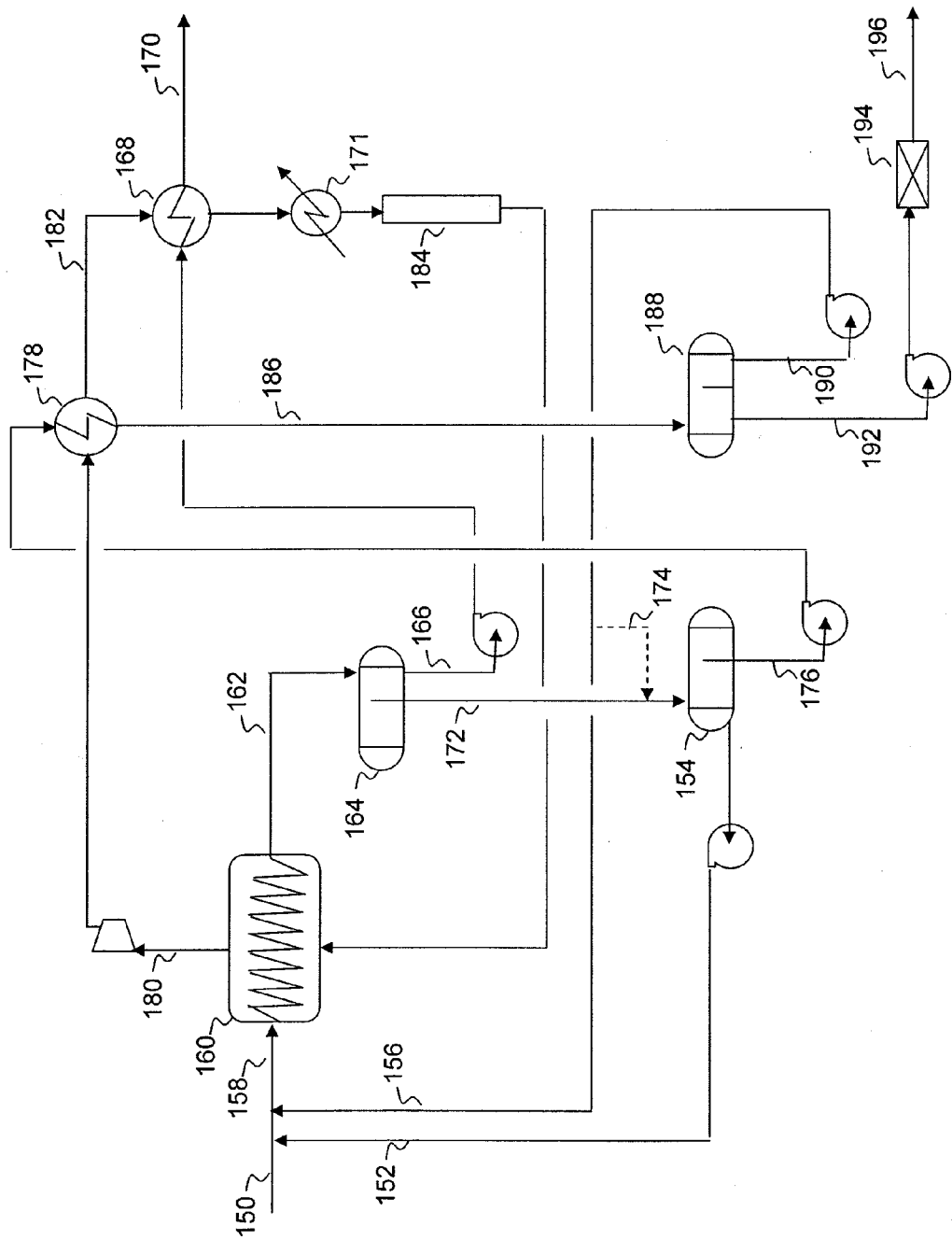

Referring now to FIG. 6, a process for recovering purified water from an aqueous mixture according to embodiments disclosed herein is illustrated. Brine is fed via flow line 150 and mixed with a small recycle stream 152 (brine concentrate) from separator 154. The resulting stream is then mixed with recirculating flotation medium fed via flow line 156, and the combined brine-flotation medium mixture is fed via flow line 158 to crystallizer 160, where it is chilled to a temperature lower than the freezing point of the brine.

The chilled, partially frozen mixture is recovered from crystallizer 160 via flow stream 162 and is fed to separator 164 wherein it separates into three layers, namely ice, flotation medium, and concentrated brine. The concentrated brine, the bottom layer, is recovered from separator 164 via flow line 166 and is pumped through heat exchanger 168 where it is warmed, and exits the desalination unit as concentrate stream 170. The upper two layers in separator 164, flotation medium and ice, are recovered as a slurry via flow line 172, optionally admixed with a flotation medium recycle stream 174 to slightly elevate the temperature of the mixture, and fed to separator 154. Separator 154 may provide additional residence time for occluded salts to dissociate from the ice. When stream 174 is used, the small rise in temperature may cause some of the ice to melt, facilitating dissociation of occluded salts. In separator 154, the mixture again separates into three layers, water/brine, flotation medium, and ice. The water/brine is withdrawn from the bottom of separator 154 via flow line 152 and is admixed with the feed brine, pre-cooling the brine via direct heat exchange. The upper two layers in separator 154, flotation medium and ice, are recovered as a slurry via flow line 176 and fed to refrigerant condenser 178, where the ice is melted and the refrigerant is partially condensed.

The brine feed and flotation medium mixture are chilled in crystallizer 160 via indirect heat exchange with refrigerant. The refrigerant vapors recovered from crystallizer 160 via flow line 180 are compressed and partially condensed in condenser 178, melting the ice. The refrigerant continues via flow line 182 to exchanger 168, where an additional portion of the refrigerant is condensed heating the concentrated brine before it exits the desalination unit via flow line 170. A subsequent secondary condenser 171, cooled by water or air, may be required to complete the refrigeration cycle. A secondary compressor (not shown) may be added to compress the uncondensed refrigerant vapors exiting the first stage condensers (either 178 or 168) to increase the efficiency of the process. Refrigerant liquid collects in refrigerant tank 184 wherefrom it is sent to crystallizer 160 to chill the incoming feed to form ice.

The molten ice and flotation medium are recovered from exchanger 178 via flow line 186 and fed to separator 188, where the mixture is separated into a water fraction and a flotation medium fraction. The flotation medium is recovered from separator 188 via flow line 190 and recycled for admixture with the incoming brine feed, as described earlier. The water fraction is recovered from separator 188 via flow line 192, through filter 194, and recovered as water product 196.

Figure 7:
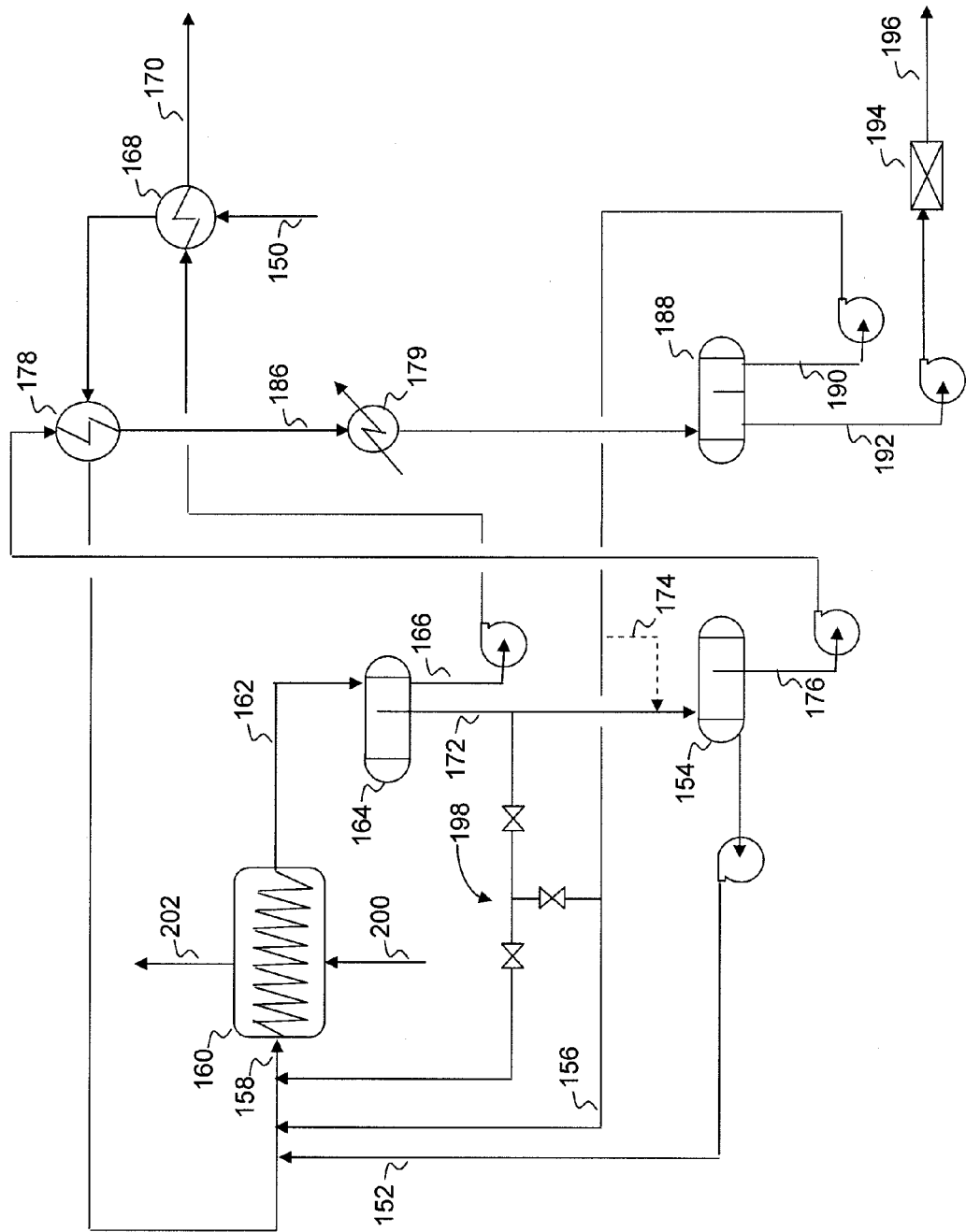

Referring now to FIG. 7, a process for recovering purified water from an aqueous mixture according to embodiments disclosed herein is illustrated, where like numerals represent like parts. In this embodiment, the feed brine and flotation medium are processed similar to that as described for FIG. 6. As opposed to a refrigeration loop, LNG is used as a refrigerant to provide cooling by indirect heat exchange in crystallizer 160, the LNG feed, line 200, being expanded and recovered as natural gas stream 202. The upper layer in separator 164, consisting of flotation medium and ice slush, exits separator tank 164 via line 172, to enter separator tank 154. Under certain circumstances, a warm slipstream 174 may be admixed before entering separator 154. Additionally for this embodiment, valve system 198 is provided to allow recycle of cold slurry of ice slush and flotation medium from separator 164 to further pre-cool the brine feed. An additional purpose of a recirculating loop is to insert nuclei into the feed streams to crystallizer 160, to promote crystal growth and to provide additional residence as required by the physical characteristics of the saline feed stream. Although not specifically mentioned, such a recirculating loop may be part of all designs and will require additional pumps (not shown). Under normal ambient temperature conditions, the incoming brine feed, stream 150, may not be warm enough to melt in exchanger 178 all the ice produced in the process unit. Accordingly, an additional exchanger 179 following exchanger 178 may be required to melt all the ice.

Figure 8:
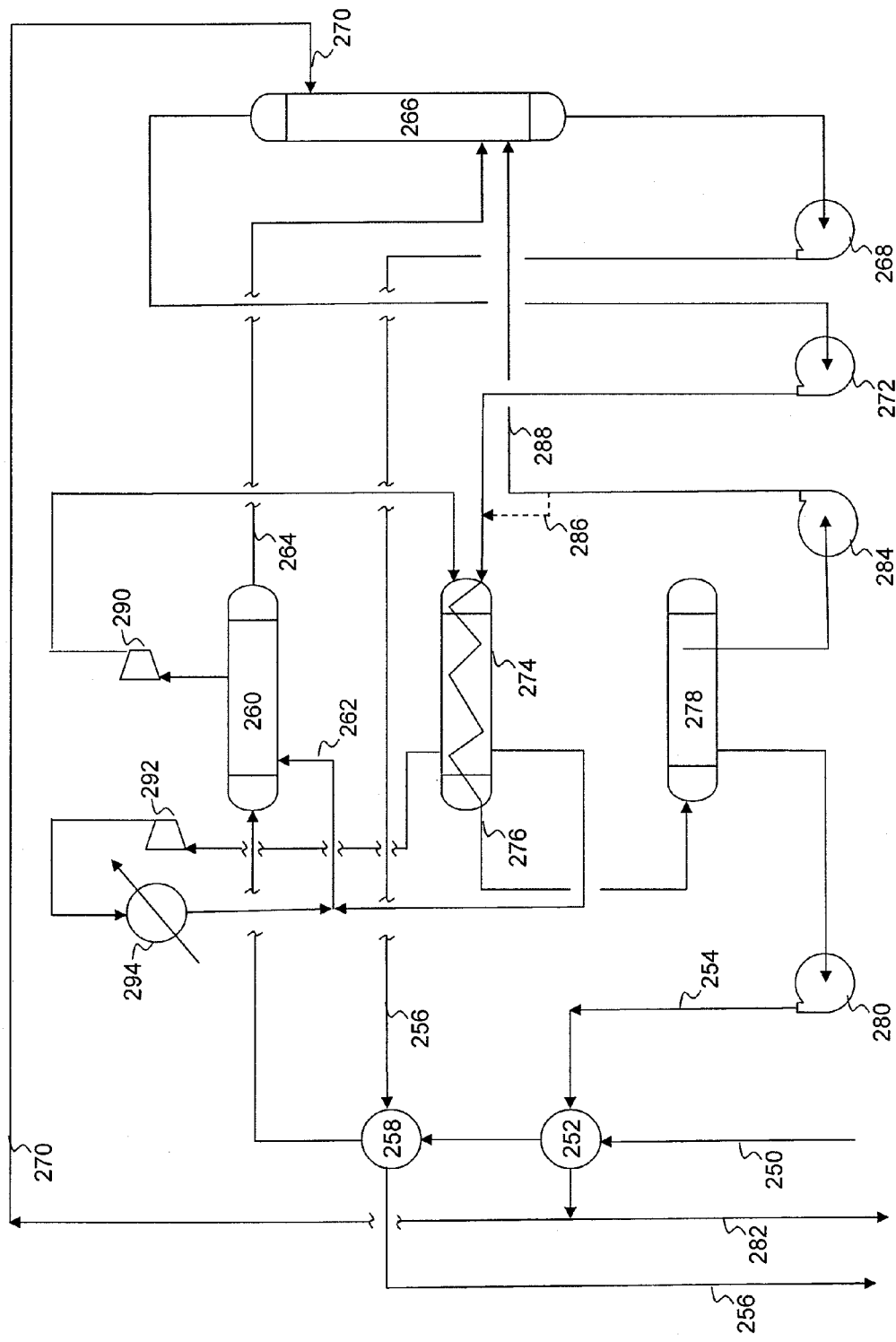

Referring now to FIG. 8, a process for recovering purified water from an aqueous mixture according to embodiments disclosed herein is illustrated. Seawater stream flow 250 enters the desalination unit at heat exchanger 252. The feed seawater is cooled in exchanger 252 by product water, flow stream 254, and then further cooled by heat exchange with out-flowing waste brine stream 256 in exchanger 258. The cooled feed stream then enters crystallizer 260 where it is chilled by direct contact with evaporating propane, which enters crystallizer 260 via flow line 262. Brine and ice slurry leave crystallizer 260 via line 264, and enter wash column 266 at a location that may be dependent on the salt concentration of the brine and ice content. Within wash column 266, the incoming mixture is contacted by up flowing flotation medium that entrains the ice crystals contained in the incoming feed stream 264. The brine, having a density higher than both the flotation medium and the ice, flows downward and exits the bottom of wash column 266 and is fed via pump 268 into exchanger 258 where it cools the incoming feed, as previously described. Upon leaving exchanger 258, the brine exits the desalination unit.

Inside wash column 266, the up flowing flotation medium carrying the ice is washed by a purified water stream that is introduced into the top of wash column 266 via flow line 270. The flotation medium and washed ice are recovered from the top of the wash column as a slurry and are fed via pump 272 to melter 274 wherein the ice is melted against condensing propane vapors. The melted ice (water) and flotation medium exit condenser 274 via flow line 276, and enter separator 278 wherein the water and flotation medium separate into two phases due to their immiscibility and differences in density. The lower phase is water, now purified, whilst the upper phase is flotation medium.

The lower phase in separator 278, product water, leaves via pump 280 through exchanger 252 where it cools the incoming feed, as previously described. Upon leaving exchanger 252, a slipstream 270 is directed to the top of wash column 266 where it washes down the up flowing ice, as described previously. The remainder of the product water stream exits the desalination unit via line 282 as product water.

The upper phase in separator 278 is flotation medium. It exits separator 278 via pump 284. A slipstream of the flotation medium, flow stream 286, is combined with the ice-flotation slurry entering melter 274, and the remaining flotation medium stream is fed via flow line 288 to the bottom of wash column 266, where it ascends, contacting the descending flow of brine as previously described.

Propane vaporized in crystallize 260 exits that vessel and is compressed in primary propane compressor 290 that feeds the now pressurized propane vapors into melter 274 wherein these vapors are partially condensed. The remaining uncondensed vapors are further compressed in secondary compressor 292, wherefrom they are introduced into secondary condenser 294 and condensed therein by heat exchange against cooling water. The condensed propane, originating from secondary condenser 294 and melter 274, are combined into flow stream 262 and fed into crystallizer 260, as previously described.

In addition to the embodiments described above, variations of these embodiments as well as other embodiments may be readily envisioned by those skilled in the art to suit the special conditions and requirements of any particular case and to take advantage of heat efficiencies, separation efficiencies, meeting product water or concentrate quality requirements, and other optimizations. For example, multi-stage compression, filtration or upstream treatment of the feed brine, optimized packing, mesh, or separator/calming zone design, among others, may be used. Additionally, the embodiments described above are simplified process flow diagrams, and one skilled in the art would readily understand that some equipment, such as pumps, valves, and control systems, among other common equipment, are not illustrated.

Figure 9:
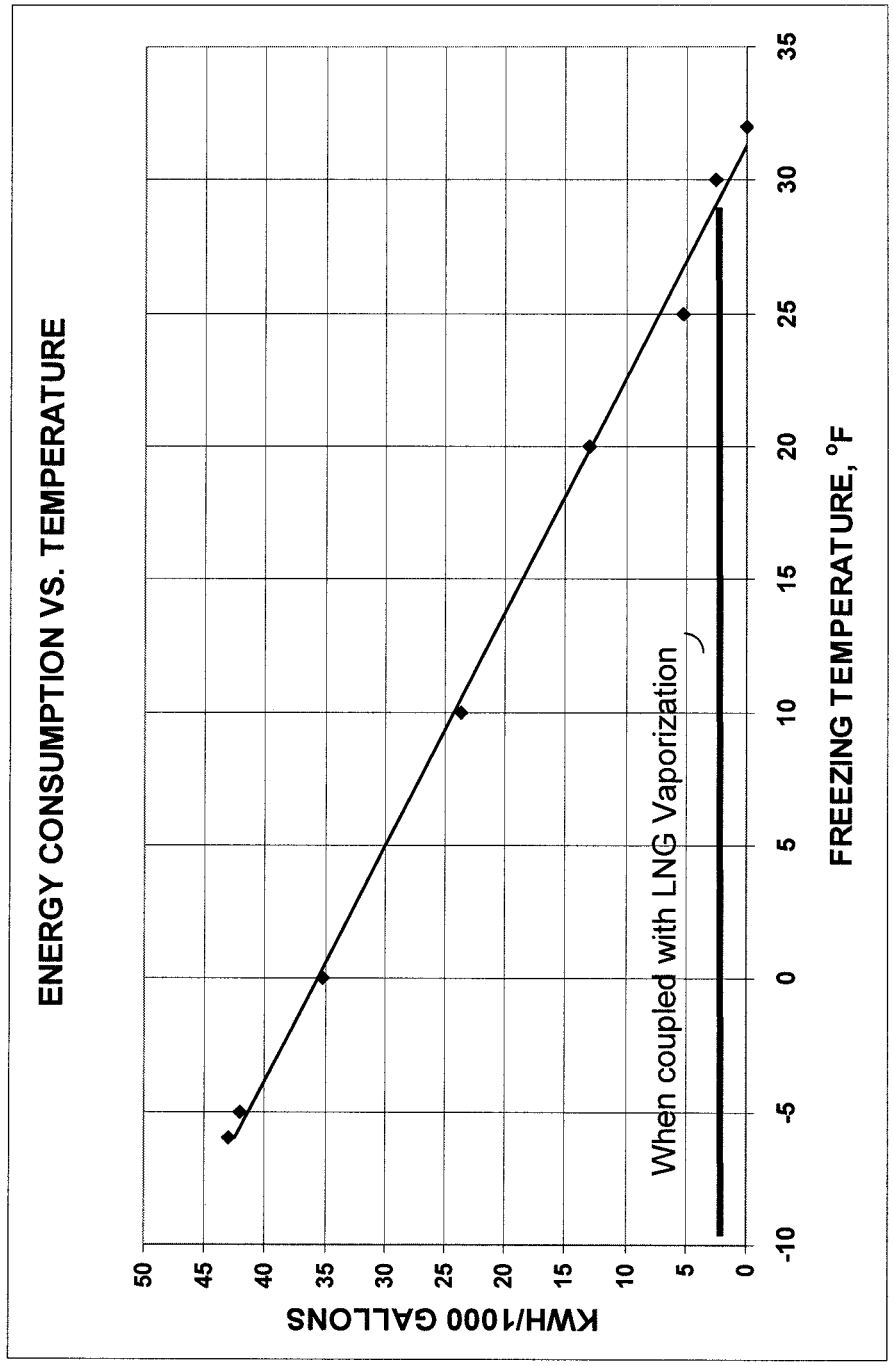
FIG. 9 is a graphical comparison of energy consumption as a function of freezing temperature for processes according to embodiments disclosed herein.

The embodiments of FIGS. 3 and 4, or similar embodiments, may be advantageously employed by locating the water purification plant next to an LNG terminal or peak shaving plants. At such locations, the energy costs for freezing would be eliminated and the LNG vaporization facility would equally benefit by avoiding the costs for vaporizing the LNG. For example, as shown in FIG. 9, an estimate of energy consumption for embodiments using LNG vaporization is compared to that of an embodiment without LNG vaporization. Due to the cryogenic temperatures achievable with LNG vaporization, the cost for water recovery is essentially constant, regardless of the freezing temperatures employed.

In general, the degree of energy conservation features incorporated into embodiments disclosed herein may depend on the plant size and purpose. The benefit ratio of savings versus additional equipment costs may be a determining factor. Small units, portable or containerized units, and to some extent intermediate size units, may be designed more for convenience than energy efficiency. Units of relatively small capacity and volume output that do not produce water on a continuous basis, such as during transport between sites, therefore may not incorporate features that large plants producing mass quantities of water on a continuous basis require. For these larger plants, energy savings may be of great importance. Accordingly, designs employed according to embodiments disclosed herein may reflect the desires of the users and will vary greatly from one to another.

As mentioned briefly above, embodiments for water purification according to embodiments disclosed herein may be containerized, such that the water purification system may be transported between locations, such as from one oil drilling or production site to another or from one natural disaster recovery area to another. The containerized systems may be contained within a single module or multiple modules, such as twenty foot or forty foot transport containers (e.g., twenty foot transport containers are typically 20 feet long by 8 feet wide by 9.5 feet tall (6.1 m×2.4 m×2.9 m) (approximately 1520 cu ft or 43 m$^3$), and forty foot transport containers are typically 40 feet long by 8 feet wide by 9.5 feet tall (12.2 m×2.4 m×2.9 m) (approximately 3040 cu ft or 85 m$^3$), but may vary somewhat from these dimensions). The containerized systems may include their own control systems, power sources, backup power sources, and other equipment that may be specific to the system and/or may be configured to connect or interact with external flow streams, control systems, and/or power systems.

Flotation mediums useful in embodiments disclosed herein, as noted above, may have a density in the range from about 0.88 to about 0.97 g/cc; from about 0.88 to about 0.95 in other embodiments; and from about 0.88 to about 0.92 in yet other embodiments. These densities, as well as the viscosities of the fluid are relevant to operating temperatures typically used in the crystallization units described above and below, and may vary outside this range at greater temperatures, such as may be used for downstream separations and/or ambient conditions.

Flotation mediums useful in embodiments disclosed herein may include various saturated or unsaturated paraffinic, cycloparaffinic, and aromatic hydrocarbons, including chloro- and fluoro-carbons, fatty acid esters, organic and synthetic oils or lubricants, low temperature synthetic base fluids, such as among others, esters derived from both natural and petrochemical raw materials, and other compounds immiscible with or of very low solubility in water (e.g., less than 0.1 wt. % solubility). Examples of flotation media may include: organic oils such as corn oils and castor oils; synthetic oils or lubricants, such as UCON Lubricant LB-65, available from the Dow Chemical Company (Midland, Mich.); saturated or unsaturated paraffinic, cycloparaffinic, and aromatic hydrocarbons, aromatics including hydrocarbons such as xylene, benzene, ethylbenzene, and higher aromatics such as biphenyls, chlorinated biphenyls, and chlorinated polyphenyls (aroclors). Mixtures of various flotation media may also be used to obtain a flotation medium having desired properties, such as melting point, viscosity, heat capacities, cost, and availability.

Figure 10:
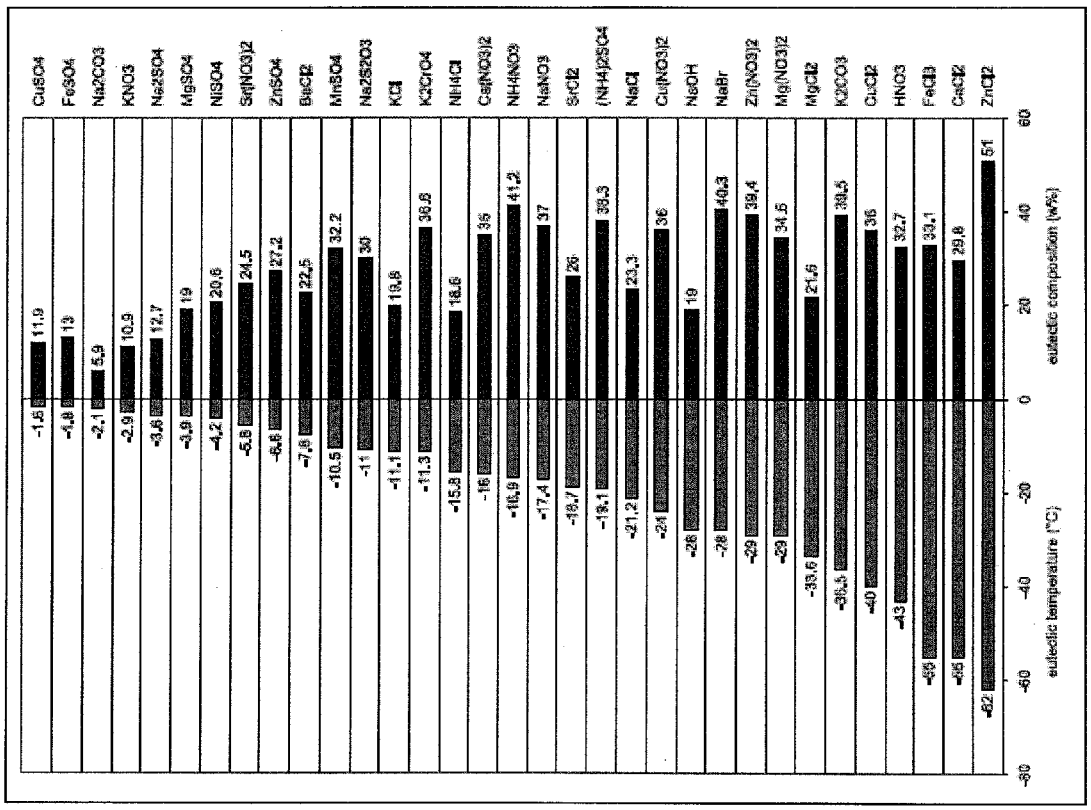
FIG. 10 is a table presenting eutectic temperatures and compositions for various water-salt binary systems.

Refrigerants useful in embodiments disclosed herein may include LNG, expanded LNG, ethane, propane, butanes, pentanes, or unsaturated hydrocarbons such as ethylene, propylene, butane or other liquefied gases and isomers thereof, as well as chloro- and fluoro-hydrocarbons having from about 1 to about 5 carbon atoms, liquid nitrogen, liquid carbon dioxide, or other liquefied compressed gases or mixtures of gases, and other heat transfer media commonly used in the art to achieve cooling of a feed stream to temperatures in the range from about −100° C. to about 0° C., the range covering eutectic temperatures for various binary salt-water systems, as illustrated in FIG. 10.

Operating temperatures in the crystallization zones may be in the range from about −100° C. or lower to about 0° C., such as in the range from about −65° C. to about −10° C. The freezing temperatures employed may be dependent upon the composition of the aqueous mixture, desired water recovery (process efficiency), and costs, among other factors.

With respect to water recovery, as water does not freeze above about 0° C., the water recovery at or about 0° C. will be very minimal due to minimal ice formation. As the system temperature is decreased, ice make will increase, thus improving water recovery percentages.

With respect to composition of the aqueous mixture, the freezing temperatures employed typically will not be below the eutectic temperature of the concentrated brine, which may change during crystallization (ice formation during the freezing step). Lower temperatures may be used, but may result in additional occluded salt, which is undesirable.

Figure 11:
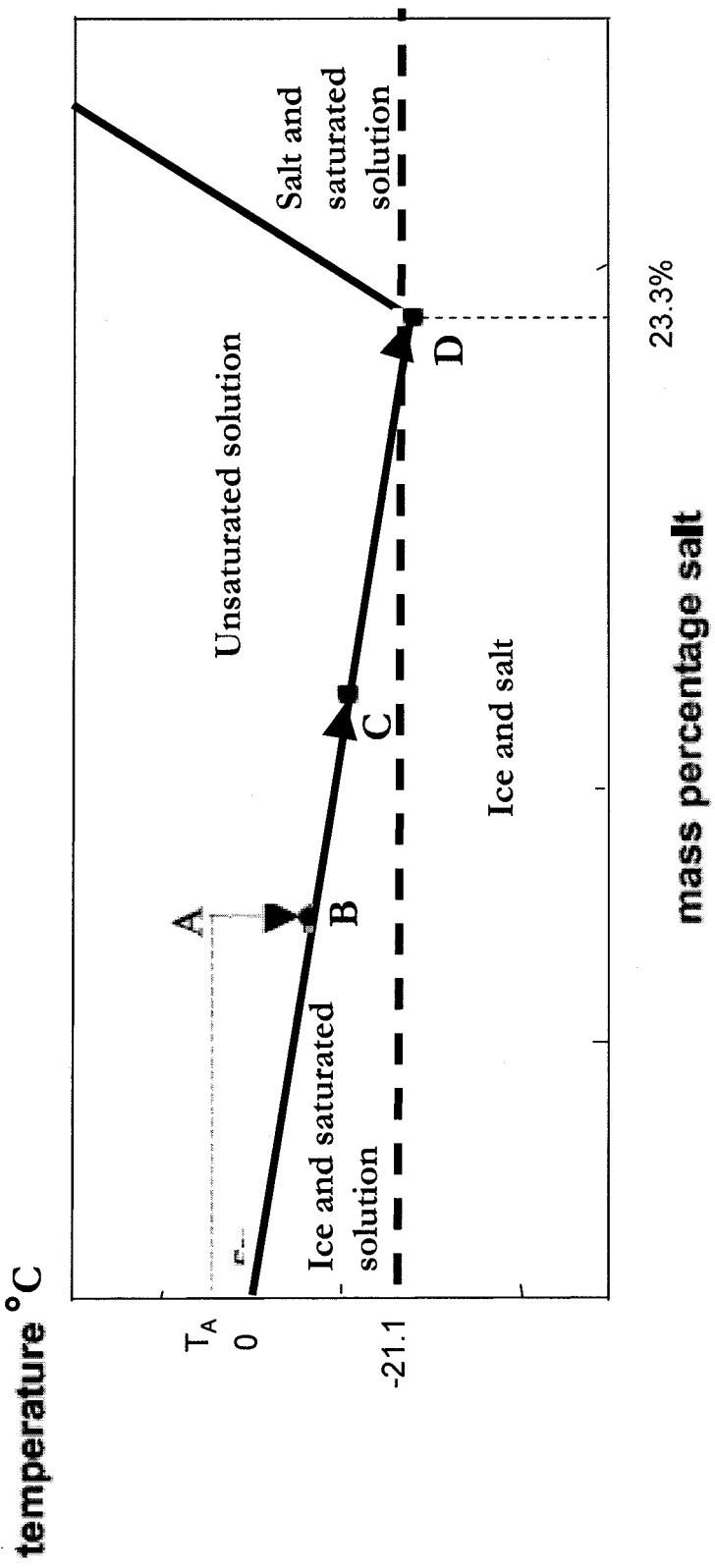
FIG. 11 is a binary phase diagram of a sodium chloride-water system annotated to illustrate operation of processes for the purification of water according to embodiments disclosed herein.

One example of operation of embodiments of the processes disclosed herein, and its dependence upon the composition of the aqueous mixture is presented in FIGS. 11-15. FIG. 11 illustrates a binary phase diagram for a water-sodium chloride solution. An unsaturated salt solution having a salt content and temperature as indicated by point A may be chilled according to embodiments disclosed herein to its freezing point, resulting in a saturated solution (point B). Further cooling below the freezing point of the aqueous mixture results in the formation of ice and concentration of the salt in the brine (moving from point B to point C). Further cooling results in the formation of additional ice and further concentration of the brine, moving from point C toward point D, where the eutectic point for sodium chloride-water systems is reached, at about −21.1° C. (about −6° F.) and about 23.3 wt. % sodium chloride (76.7 wt. % water).

Further heat removal upon reaching the eutectic temperature will not reduce the temperature of the mixture any further. The temperature will remain constant until all the water in the mixture has turned to ice. When operating at the eutectic temperature, the rate of heat removal should be relatively slow since rapid cooling may result in the formation of ice that has a greater abundance of occluded salt, making it more difficult to recover pure water. At the appropriate rate of heat removal and the presence of a flotation medium having the required physical characteristics for operation at the eutectic temperature, salt will drop out of solution (crystallize) simultaneously with the formation of ice crystals and the flotation medium will separate the ice crystals from the salt crystals. This separation will occur due to the differences in densities, the ice being lighter floating upwards and being entrained by the rising flotation medium, whereas the salt crystals, being heavier than both the flotation medium and the remaining brine concentrate, will sink toward the bottom of the crystallizer. Great care should be taken with regard to the rate of heat removal to avoid solidifying the entire mass. Enough concentrated brine and/or floating medium should be left in the bottom of the crystallizer in order to avoid a solid mass and keep the salt crystals in a fluid medium. In some embodiments, cooling may be applied to reach a slurry consisting of 20 wt. % to 30 wt. % salt crystals (precipitates) in 70-80% liquid (concentrated brine and flotation liquid), thus allowing for conventional pumping and handling of the salt slurry.

Figure 12:
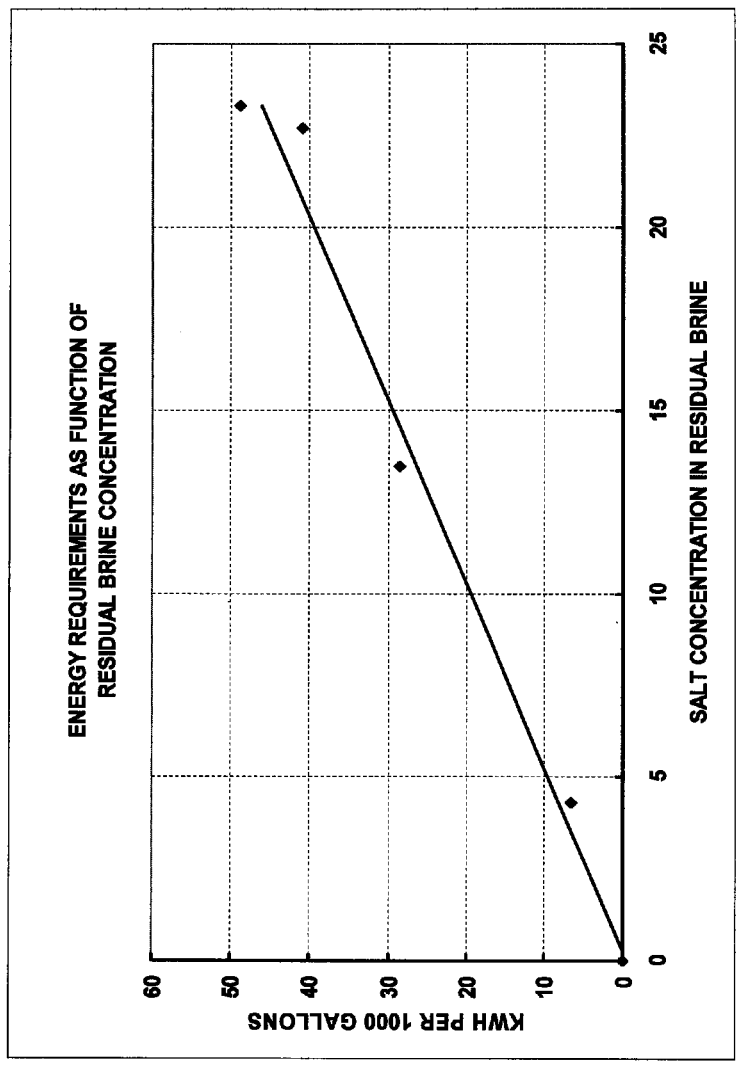
FIGS. 12-15 are charts illustrating the interrelationship of energy consumption, residual brine composition, pure water recovery, freezing temperature and typical recovered water costs for processes according to embodiments disclosed herein.
Figure 13:
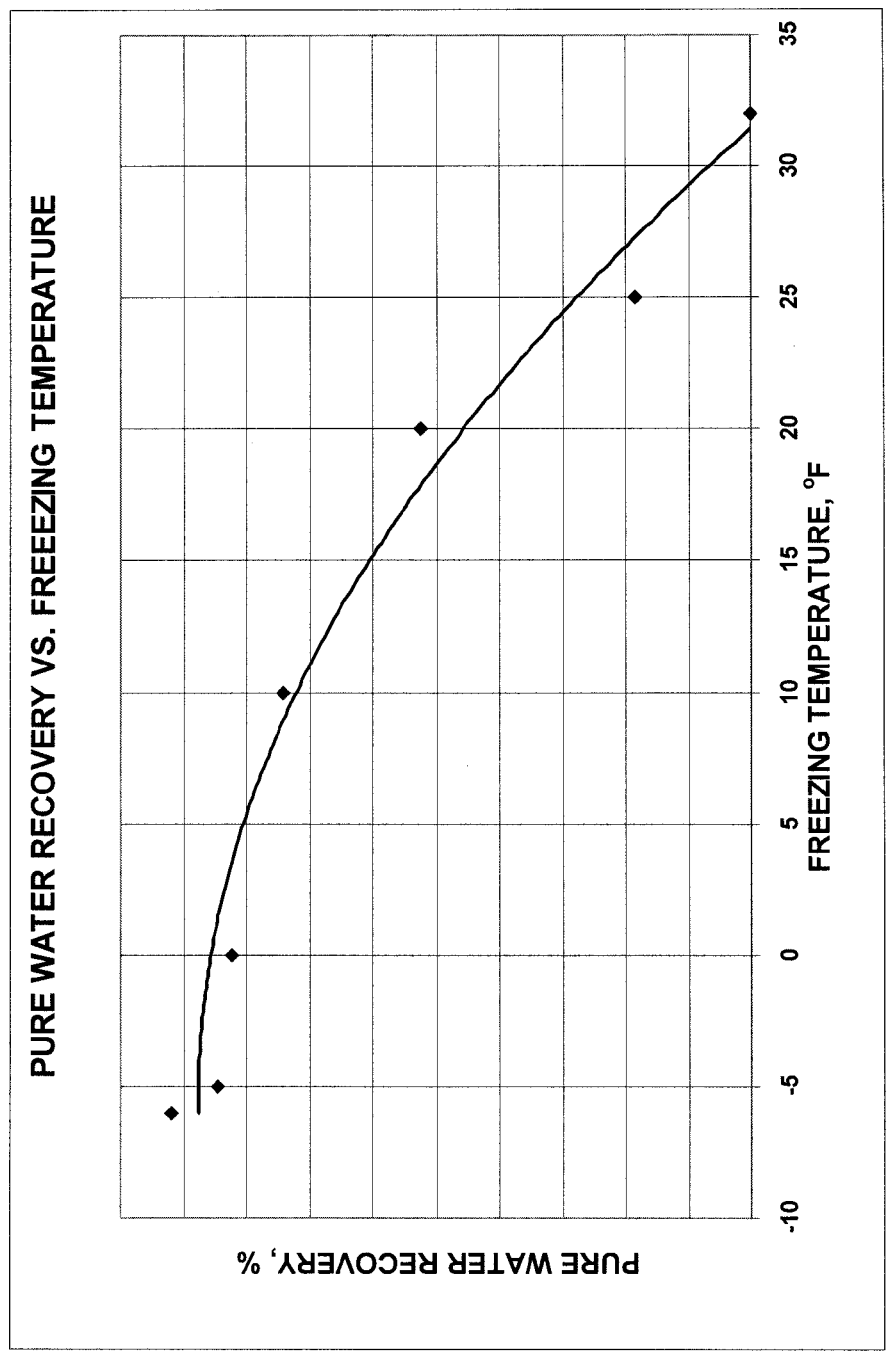
Figure 14:
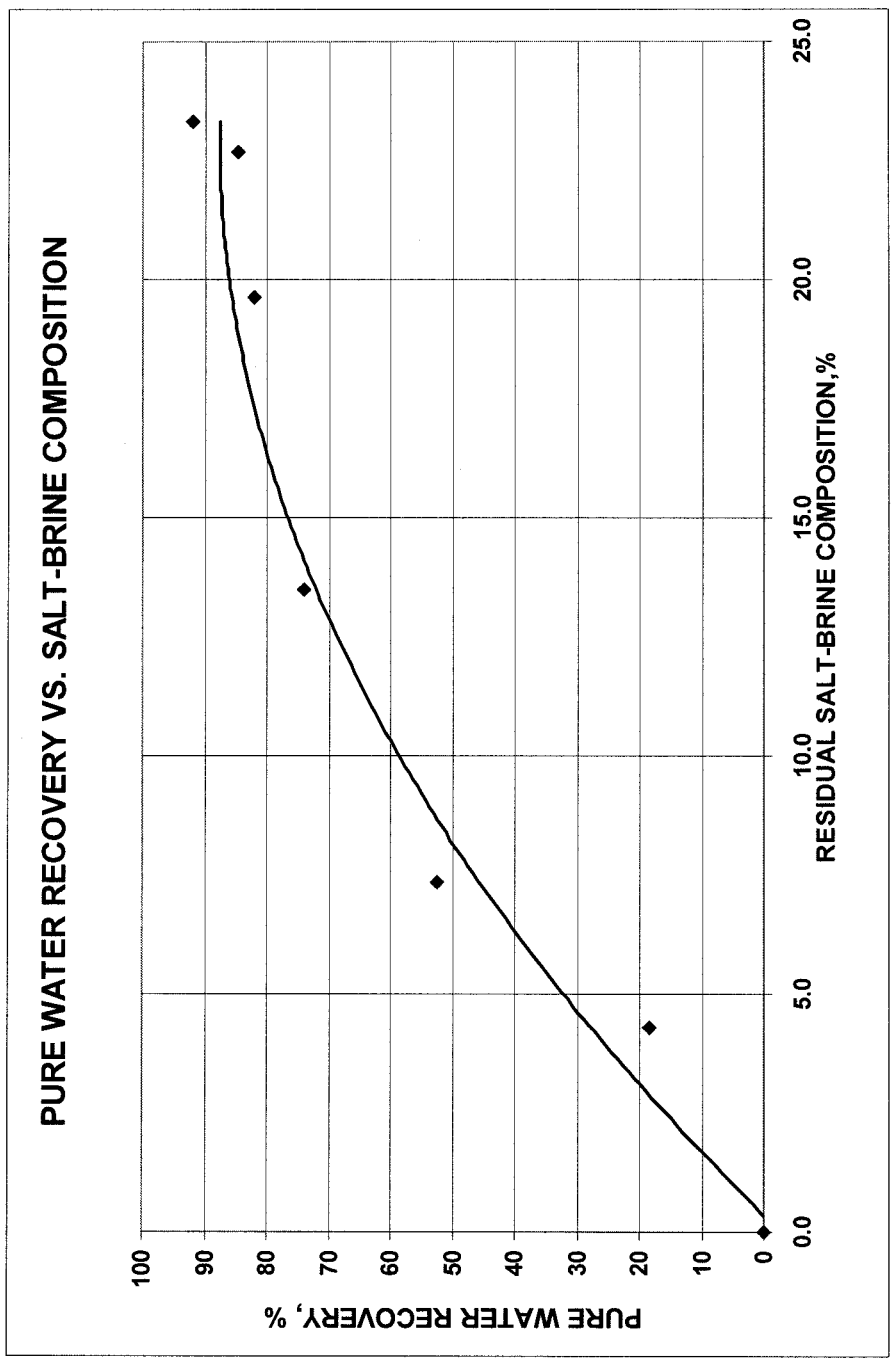

Costs for recovery of water and water recovery efficiencies as a function of operating temperature (and therefore concentrated brine composition) were calculated. FIG. 12 illustrates the energy consumption as a function of brine concentrate composition. FIG. 13 illustrates the percentage recovery of pure water as a function of freezing temperature between the freezing point of water (0° C.) and the eutectic point of the composition (−21.1° C. (−6° F.)). FIG. 14 illustrates the percentage recovery of pure water as a function of brine concentrate composition.

Figure 15:
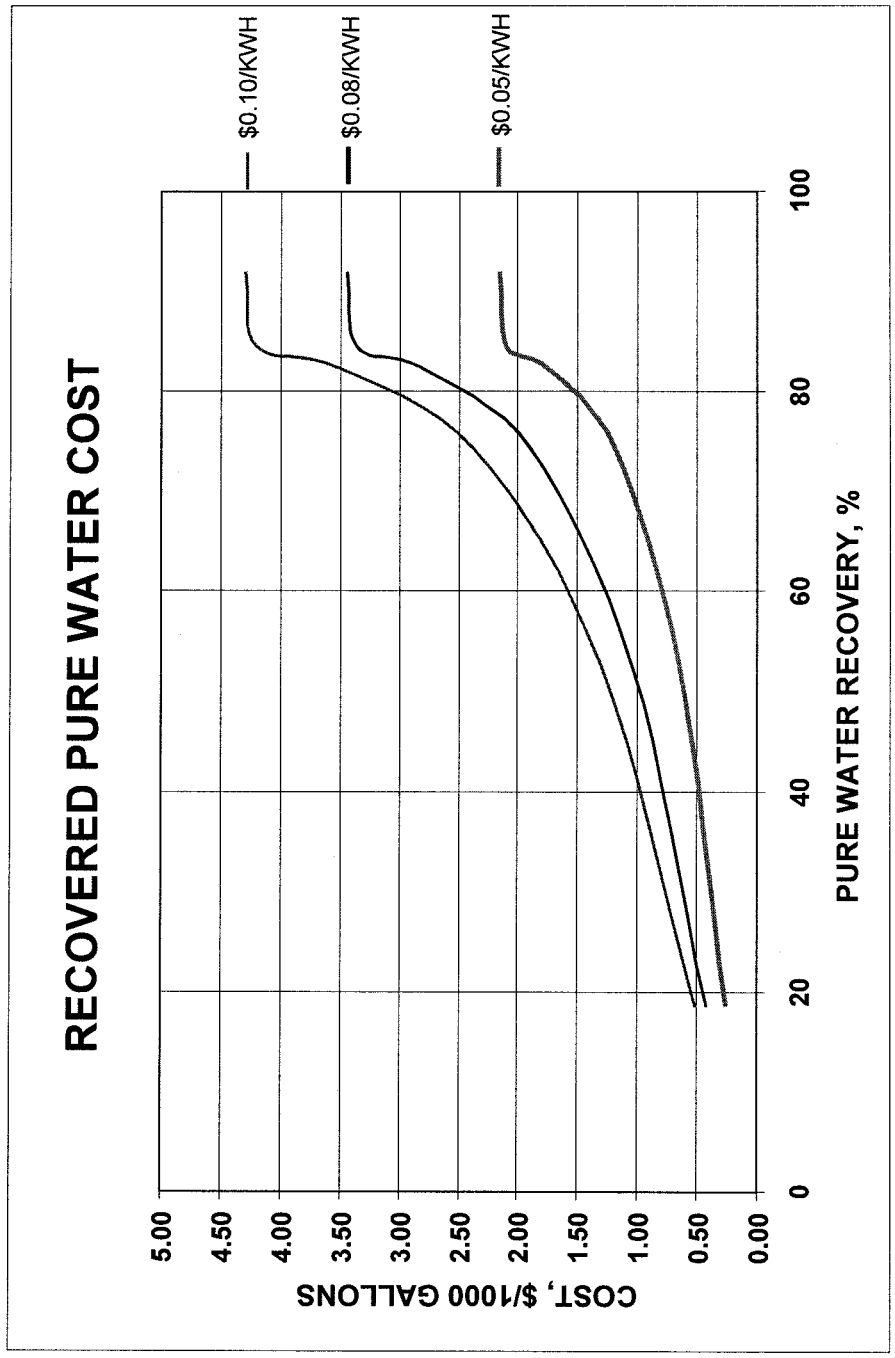

As shown in FIGS. 13 and 14, the percentage recovery of water reaches about 85% when approaching the eutectic temperature. Further water recovery is possible but entails greater complexities of operation. However, further increase of the percentage recovery of pure water requires only minor incremental increases in unit power consumption as illustrated in FIG. 15.

As an example of the benefits that may be achieved using processes according to embodiments disclosed herein, oil drilling and production facilities generate huge quantities of brines or produced water as a byproduct. The American Petroleum Institute estimated, in 1987, that on average, each barrel of oil produced generates a byproduct of about seven barrels of produced water. Other sources of produced water may include coal bed methane produced water, mining waste waters, and others. Management of the produced water streams is thus important to the industry and may have a significant impact on costs as well as the environment.

Figure 16:
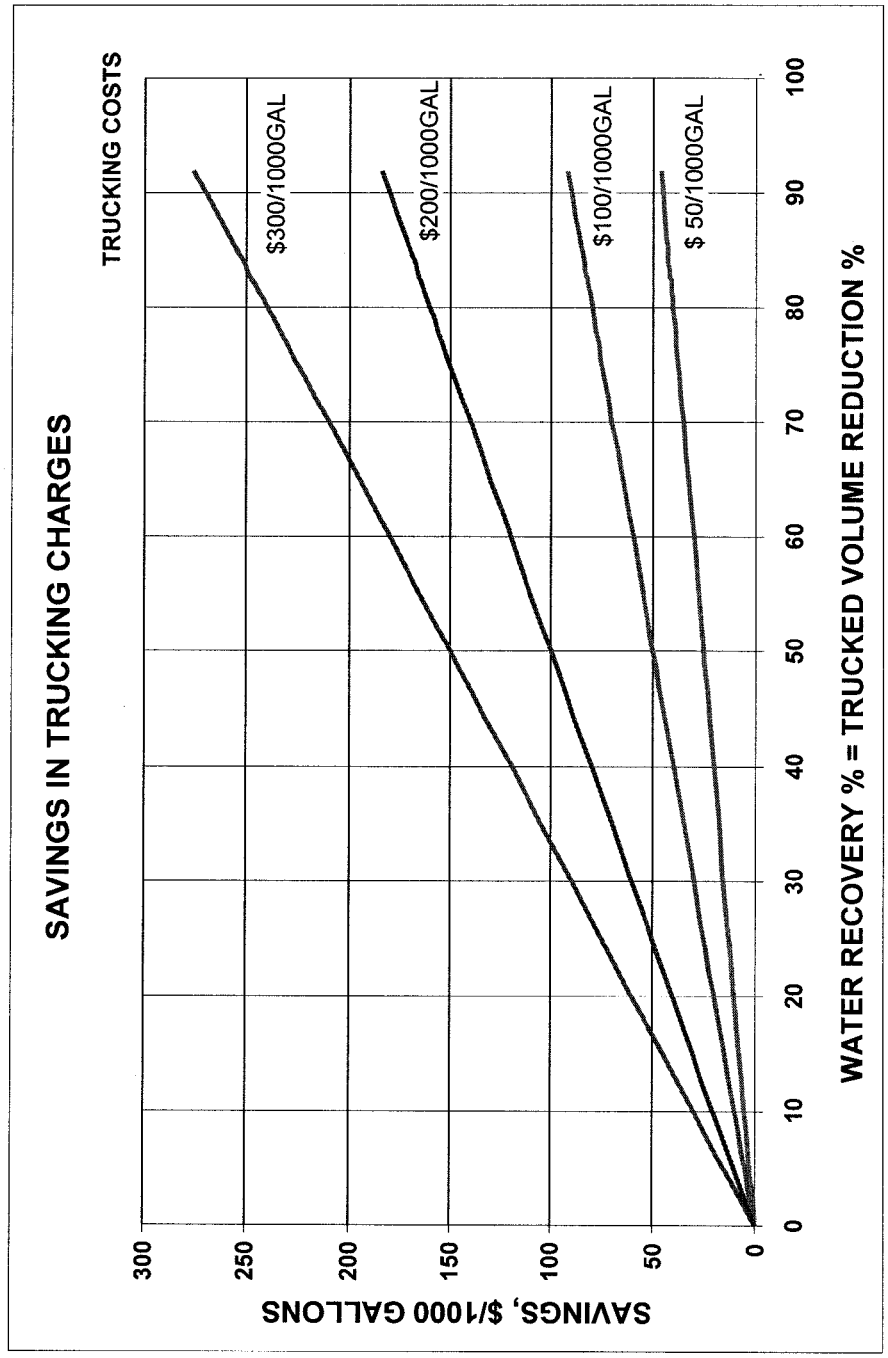
FIG. 16 is a graph illustrating savings in trucking costs that may be realized by producing purified water and reducing the total wastewater resulting from a produced water stream.

Producing purified water from produced water streams may result in a decreased environmental impact, as readily envisioned by one skilled in the art. Further, the industry norm is to truck the produced water off-site for disposal or alternative processing. Embodiments disclosed herein may significantly reduce the costs of trucking and disposal, due to the resulting decrease in residual quantities of water, reducing the amount of waste water produced. The water recovery percentages shown in FIGS. 12-15 would be equivalent to the reduction in trucked volume that could be achieved, and the possible savings realizable, for example, are illustrated in FIG. 16. The resulting waste stream may thus be as low as 5% of the original volume, thus providing large transportation cost savings.

As noted above, brine adherence to ice crystals has been the major impediment to the use of freezing desalination for the production of drinking water. This novel ice-brine separation process disclosed herein solves the longstanding ice-harvesting problem of desalination. Mass balance equations, detailed below, show the possibility of obtaining potable water even when brine adheres to the ice crystals. Potable water can be obtained in a counter current flow column serving as freezer, using molten ice (water) reflux as a wash liquid. Based on these equations, FIG. 17 permits to step off the number of required theoretical Transfer Units to reach the desired concentration of the product streams. This theoretical number is important as it helps to determine the effect of changing product specifications on column height (proper design of crystallizer columns or brine-ice-flotation medium separators according to embodiments disclosed herein). It also helps to determine the optimum location on the column for the saline feed introduction.

The nomenclature for slush, ice crystals, adhering brine, feed, product water, and reject waste brine and the concentration of salts is defined for the following abbreviations:

Subscripts
ab refers to adhered brine
b refers to brine
f refers to feed
i refers to ice crystal
p refers to product water
s refers to slush
w refers to reject waste brine capital letters
W denotes mass
S denotes mass Slush
C denotes Salt Concentration If the ratio of adhered brine to ice is $$A = \frac{W_{ab}}{W_i} \quad (1)$$

The mass fraction of adhered brine in slush is $$\frac{W_{ab}}{W_{ab} + W_i} = \frac{AW_i}{AW_i + W_i} = \frac{A}{A+1} \quad (2)$$

The total mass of Salt in the Slush is $$SC_s = W_i C_f + AW_i C_b \quad (3)$$

Since Ice crystals are salt free $$C_i = 0$$

therefore $SC_s = AW_iC_b$ \hfill (4)

and $$C_s = \frac{AW_iC_b}{S} \quad (5)$$

Since $S = W_{ab} + W_i$ \hfill (6)

Substituting (1) into (6) $S = AW_i + W_i = W_i(A+1)$ \hfill (7)

Substituting (7) into (5) $C_s = [A/(A+1)]C_b$ \hfill (8)

Figure 17:
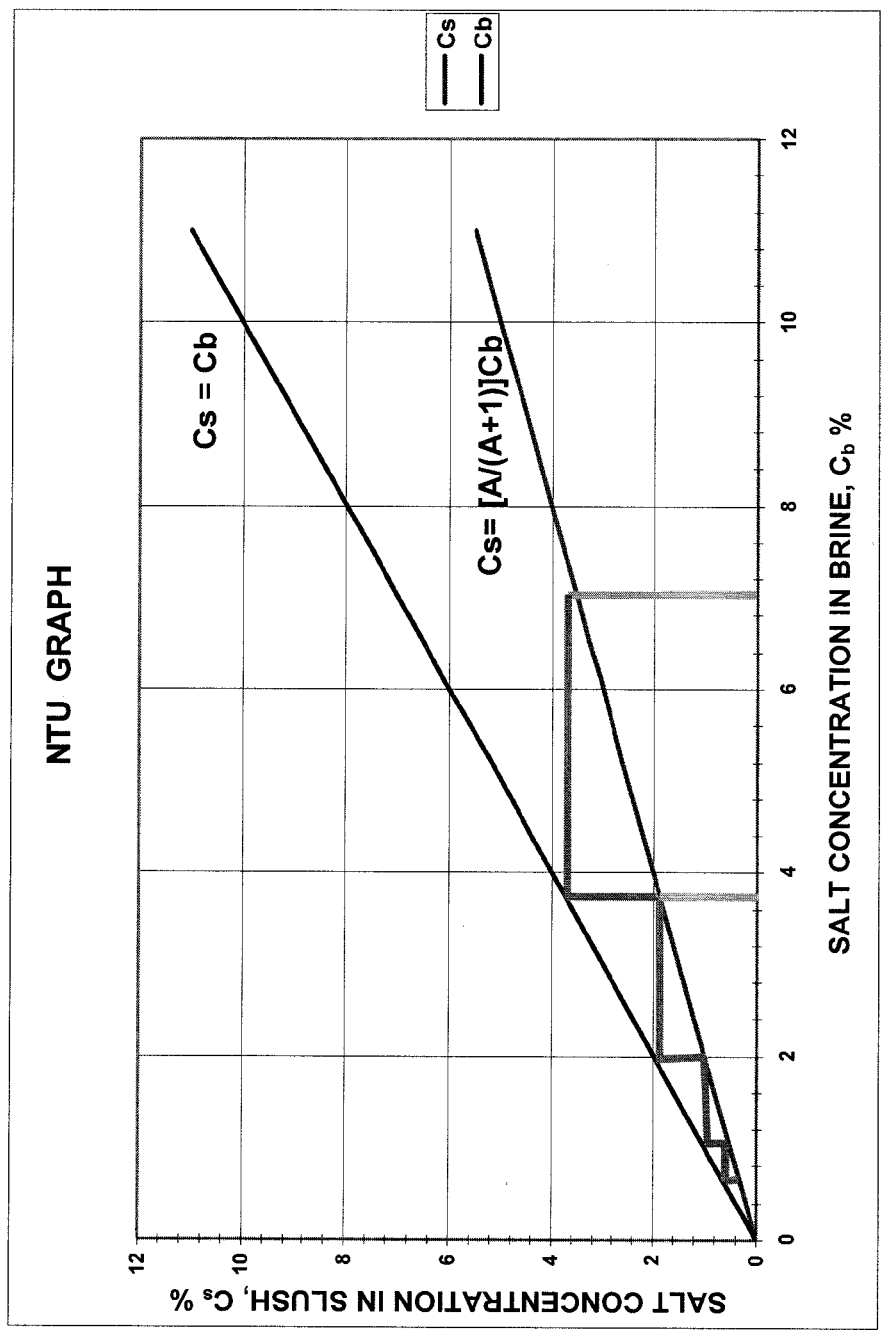
FIG. 17 is a graph illustrating the calculation of the number of theoretical transfer units for countercurrent flow operations according to embodiments disclosed herein.

FIG. 17 is a plot of Equation (8). It shows the salt concentration of the slush for any brine concentration as a function of A, the ratio of brine adhering to the ice crystal. The required number of theoretical Transfer Units, NTU's, is obtained by locating on the abscissa, for any set of conditions, the value of the concentration of the waste brine effluent. The latter is calculated from the desired recovery of potable water. The salt concentration of the resulting slush is read by proceeding vertically up to line $C_s$. Moving horizontally to the left at the intersection with line $C_b$ is the concentration of brine in the second Transfer Unit. By continuing to step off between the two lines, the desired product water purity is reached, the number of steps being equal to the NTU's.

The actual height of a Transfer Unit must be obtained experimentally, and may depend upon the composition of the brine (the salt or mixture of salts or other contaminants in the water). The height of a transfer unit may also depend on such factors as flotation medium to ice ratio, wash water to feed brine ratio, rate of nucleation, agitation, and in addition, equipment design. It is also noted that the ratio of brine adherence may be determined during column operations, based on the purity of the recovered water, as well as other relevant factors as may be readily envisioned by one skilled in the art.

Using the above calculations, one can thus design an appropriately sized column for purifying water according to embodiments disclosed herein. For example, design and construction procedures according to embodiments disclosed herein may include one or more of the following steps:

(a) determining a ratio of brine adherence to ice for a given aqueous mixture, which may be a function of one or more of aqueous mixture composition, freezing rates, flotation medium feed rate, flotation medium feed temperature, flotation medium, aqueous mixture feed temperature, aqueous medium feed rate, water wash temperature, and water wash rate, among other factors;

(b) calculating the number of theoretical transfer units to result in a desired water purity for the aqueous mixture;

(c) determining a height of a theoretical transfer unit for the aqueous mixture;

(d) designing or constructing a water purification process using one or more countercurrent flow columns according to embodiments disclosed herein (such as shown in FIGS. 1A-1F) having a height or combined height equivalent to or within 20% of the determined height multiplied by the number of theoretical transfer units.

Alternatively, one may tailor the operations of an existing column to a particular aqueous mixture. For example, a containerized system according to embodiments disclosed herein may be transported to a site. The column and column operations may then be configured at the site based on the properties of the aqueous mixture, the desired water recovery percentages, water purity, and other factors. In some embodiments, optimization of operation for systems according to embodiments disclosed herein may include one or more of the following steps:

(a) determining a ratio of brine adherence to ice for a given aqueous mixture, which may be a function of one or more of aqueous mixture composition, freezing rates, flotation medium feed rate, flotation medium feed temperature, flotation medium, aqueous mixture feed temperature, aqueous medium feed rate, water wash temperature, and water wash rate, among other factors;

(b) calculating the number of theoretical transfer units to result in a desired water purity for the aqueous mixture;

(c) determining a height of a theoretical transfer unit for the aqueous mixture;

(d) determining a feed location (height) for the aqueous mixture and/or the flotation medium, based on one or more of the determined height, the determined brine adherence ratio, the calculated number of theoretical transfer units, desired concentrate slurry concentration, desired water purity, desired water recovery percentage, freezing temperature, minimum flotation medium temperature, and mixture eutectic temperature, among others;

(e) adjusting a temperature of the flotation medium and/or the water wash based on the determined ratio of brine adherence;

(f) adjusting a flow rate of the water wash, the flotation medium, and the brine based on the determined ratio of brine adherence.

Adjusting the conditions during the freezing process, such as in steps (e) and (f) may provide for the advantageous formation of a desired ice crystal structure. In turn, formation of the desired ice crystal structure may be used to minimize brine adhesion and improve the overall efficiency of the process. Displacement of adhering concentrate from the ice surfaces may also be improved by adjusting or varying the temperature of the wash liquid.

Processes according to embodiments disclosed herein may also be used to recover selectively various salts and metals, such as those noted in FIG. 10, among others. Temperature and concentration gradients achievable using the countercurrent flow columns disclosed herein may allow for the selective crystallization of salts or the selective precipitation of metals, in one or more columns, by stepwise decreasing the operating temperature. For a system having two or more of the salts noted in FIG. 10 for example, the initial precipitate may contain a high purity of the salts having a higher eutectic temperature, and as the operating temperature is decreased, salts having a lower eutectic temperature may precipitate out of solution. Thus, use of temperature gradients across one or more columns according to embodiments disclosed herein may provide for selective salt and/or metal recovery from aqueous mixtures.

While selective salt recovery may advantageously employ two countercurrent columns according to embodiments disclosed herein, energy efficiencies may also be realized by using two or more countercurrent columns within the embodiments disclosed herein. By partially freezing the saline solution stepwise in separate vessels, the system may enhance the energy efficiency by reducing the total refrigeration requirement, thus reducing the power consumption.

As described above, water purification systems according to embodiments disclosed herein advantageously harvest ice (i.e., purified water) as a slurry with flotation medium. Separation of the ice and brine in this manner overcomes the significant hurdle of ice recovery, greatly improving the viability of the freezing process for purification of water or formation of concentrates.

Embodiments disclosed herein may provide for one or more of the following advantages as compared to distillation and vapor compression: no or minimal heat transfer metal surfaces, low temperature differentials, less thermodynamic inefficiencies, no corrosion problems or scaling problems (due in part to the low temperature operations), no or little feed pretreatment.

Embodiments disclosed herein may also have one or more of the following advantages as compared to distillation and/or osmosis: low capital investment, low energy consumption, low operating costs, low maintenance, no chemicals, low environmental footprint, no salinity limitations in the feed stream, continuous operations, and scalability. Processes according to embodiments disclosed herein may be built in a permanent location, or may be modular skid-mounted units, applicable to industrial, agricultural, military, and marine use, as well as disaster relief. Smaller units may also be provided for residential use.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for purifying water, comprising:
   contacting an aqueous mixture with a flotation medium, wherein the flotation medium has a density greater than or equal to the density of ice or hydrate and less than the density of the aqueous mixture or a concentrated brine thereof at its freezing point;
   reducing the temperature of the aqueous mixture to a temperature below the freezing point of the aqueous mixture to form ice or hydrate and a concentrate comprising brine and precipitated solids; and
   phase separating the concentrate and the flotation medium;
   recovering the concentrate; and
   recovering the ice or hydrate and flotation medium as a slurry.

2. The process of claim 1, wherein the flotation medium has a density in the range from about 0.8 to about 1.0 g/cc.

3. The process of claim 1, further comprising melting the ice in the recovered slurry of ice or hydrate and flotation medium to form an aqueous fraction comprising water.

4. The process of claim 3, further comprising separating the aqueous fraction from the flotation medium.

5. The process of claim 1, further comprising washing the slurry with a wash liquid comprising at least one of fresh water, the aqueous fraction, and flotation medium, which may be the same or different than the flotation medium used in the contacting step.

6. The process of claim 5, further comprising adding to the wash liquid one or more additives improving the displacement of concentrate adhering to the ice surfaces.

7. The process of claim 5, in which the temperature of the wash liquid is varied to enhance the displacement of concentrate adhering to the ice.

8. The process of claim 1, wherein the temperature of the aqueous mixture is reduced by direct heat exchange, indirect heat exchange, or a mixture thereof, or by vacuum evaporation of some water contained in the mixture.

9. The process of claim 1, wherein the temperature of the aqueous mixture is reduced by direct heat exchange, indirect heat exchange, or a mixture thereof, with at least one of liquid natural gas (LNG), expanded LNG, ethane, propane, ethylene, propylene, and other cryogenic liquids.

10. The process of claim 1, wherein the contacting and temperature reducing steps are performed at the same time.

11. The process of claim 1, wherein the contacting step is performed prior to the temperature reducing step.

12. The process of claim 1, wherein the aqueous mixture comprises at least one of seawater, brackish water, brine, saline water, produced water, salts of any kind, alcoholic beverages, coffee, tea, orange juice, and urine.

13. The process of claim 1, wherein the flotation medium comprises at least one of an organic oil, a saturated or unsaturated paraffinic, cycloparaffinic, and aromatic hydrocarbon, a synthetic oil or lubricant, and a low temperature synthetic base fluids.

14. The process of claim 1, further comprising:
   contacting the flotation medium-ice slurry with a fluid having a higher density than the flotation medium;
   displacing adhering or occluded concentrate into the concentrate; and
   phase separating the flotation medium/ice, the fluid, and the concentrate.

15. The process of claim 1, further comprising:
   contacting the recovered concentrate with a second flotation medium, which may be the flotation medium, wherein the second flotation medium has a density greater than or equal to 0.8 and less than the density of the concentrate at its freezing point;
   reducing the temperature of the concentrate to a temperature equal to or below the freezing point of the concentrate to form ice or hydrate and a second concentrate;
   phase separating the second concentrate and the second flotation medium;
   recovering the second concentrate; and
   recovering the ice or hydrate and second flotation medium as a slurry.

16. The process of claim 15, further comprising forming a precipitate while removing heat from the aqueous mixture.

17. The process of claim 16, further comprising:
   forming a second precipitate during further heat removal from the concentrate.

18. The process of claim 17, wherein the precipitate comprises a different salt or a different metal or mixtures of salt and/or metals than the second precipitate.

19. The process of claim 1, wherein purified water recovered is greater than 85% of the water contained in the original aqueous mixture.

20. The process of claim 1, further comprising one or more of:
   i. determining a ratio of brine adherence to ice for a given aqueous mixture as a function of one or more of aqueous mixture composition, freezing rates, flotation medium feed rate, flotation medium feed temperature, flotation medium, aqueous mixture feed temperature, aqueous medium feed rate, water wash temperature, and water wash rate;
   ii. calculating the number of theoretical transfer units to result in a desired water purity or water recovery percentage for the aqueous mixture;
   iii. determining a height of a theoretical transfer unit for the aqueous mixture;
   iv. determining a feed location for the aqueous mixture and/or the flotation medium, based on one or more of the determined height, the determined brine adherence ratio, the calculated number of theoretical transfer units, desired concentrate slurry concentration, desired water purity, desired water recovery percentage, freezing temperature, minimum flotation medium temperature, and mixture eutectic temperature;

v. adjusting a temperature of the flotation medium and/or the water wash based on the determined ratio of brine adherence; and vi. adjusting a flow rate of the water wash, the flotation medium, and the brine based on the determined ratio of brine adherence.

21. The process of claim 1, wherein the temperature of the aqueous mixture is reduced to a temperature in the range from about −10° C. to about −65° C.

22. The process of claim 1, wherein the flotation medium comprises corn oil.

23. A process for purifying water, comprising:

contacting an aqueous mixture with a flotation medium, wherein the flotation medium has a density greater than or equal to the density of ice or hydrate and less than the density of the aqueous mixture or a concentrated brine thereof at its freezing point;

reducing the temperature of the aqueous mixture to a temperature in the range from about −15° C. to about −65° C. to form ice or hydrate and a concentrate;

phase separating the concentrate and the flotation medium;

recovering the concentrate; and recovering the ice or hydrate and flotation medium as a slurry.

24. The process of claim 23, wherein the temperature of the aqueous mixture is reduced by direct heat exchange, indirect heat exchange, or a mixture thereof, with at least one of liquid natural gas (LNG), expanded LNG, ethane, propane, ethylene, propylene, and other cryogenic liquids.

25. The process of claim 23, wherein the reducing step is performed at a pressure greater than atmospheric pressure.

* * * * *